(12) United States Patent
Suzuki et al.

(10) Patent No.: US 12,038,620 B2
(45) Date of Patent: Jul. 16, 2024

(54) IMAGE RELAY DEVICE AND IMAGE PROJECTION SYSTEM

(71) Applicant: QD Laser, Inc., Kanagawa (JP)

(72) Inventors: Makoto Suzuki, Kanagawa (JP); Kenji Yasui, Kanagawa (JP); Kazutaka Saito, Kanagawa (JP)

(73) Assignee: QD Laser, Inc., Kanagawa (JP)

( * ) Notice: Subject to any disclaimer, the term of this patent is extended or adjusted under 35 U.S.C. 154(b) by 429 days.

(21) Appl. No.: 17/593,575

(22) PCT Filed: Mar. 25, 2020

(86) PCT No.: PCT/JP2020/013371
§ 371 (c)(1),
(2) Date: Sep. 21, 2021

(87) PCT Pub. No.: WO2020/196637
PCT Pub. Date: Oct. 1, 2020

(65) Prior Publication Data
US 2022/0196961 A1 Jun. 23, 2022

(30) Foreign Application Priority Data

Mar. 28, 2019 (JP) .................................. 2019-063722
Mar. 9, 2020 (JP) .................................. 2020-040194

(51) Int. Cl.
*G02B 7/02* (2021.01)
*G02B 7/16* (2021.01)
(Continued)

(52) U.S. Cl.
CPC ............... *G02B 7/023* (2013.01); *G02B 7/16* (2013.01); *G02B 26/105* (2013.01); *G03B 21/2033* (2013.01)

(58) Field of Classification Search
CPC ........ G02B 7/023; G02B 7/16; G02B 26/105; G02B 26/0833; G02B 27/0075; G02B 27/02; G03B 21/2033
See application file for complete search history.

(56) References Cited

U.S. PATENT DOCUMENTS 5,587,836 A 12/1996 Takahashi et al.
7,832,877 B2 11/2010 Yun et al.
(Continued)

FOREIGN PATENT DOCUMENTS

JP S61-185247 8/1986
JP H06-324285 11/1994
(Continued)

OTHER PUBLICATIONS

G. Kramida, "Resolving the Vergence-Accommodation Conflict in Head-Mounted Displays, " in IEEE Transactions on Visualization and Computer Graphics, vol. 22, No. 7, pp. 1912-1931, Jul. 1, 2016, doi: 10.1109/TVCG.2015.2473855. (Year: 2016).*
(Continued)

*Primary Examiner* — Magda Cruz
(74) *Attorney, Agent, or Firm* — IPUSA, PLLC

(57) ABSTRACT

An image relay device that projects laser light representing an image emitted from a projection device onto the retina is provided. The image relay device includes a projection device, a first optical member, and a second optical member. The projection device includes a light source configured to emit laser light and a scan unit configured to scan the laser light based on image data. The first optical member receives an image light from the projection device and converts the image light which is a parallel light, to light beams of convergent light. The second optical member converts the light beams output from the first optical member into parallel light.

16 Claims, 33 Drawing Sheets

(51) Int. Cl.
  *G02B 26/10*   (2006.01)
  *G03B 21/20*   (2006.01)

(56) References Cited

U.S. PATENT DOCUMENTS

| | | | |
|---|---|---|---|
| 10,058,454 | B2 | 8/2018 | Chayet et al. |
| 10,409,146 | B2* | 9/2019 | Sugawara .......... G03B 21/2033 |
| 2003/0164933 | A1 | 9/2003 | Nishi et al. |
| 2012/0218525 | A1 | 8/2012 | Kwon et al. |
| 2012/0327379 | A1 | 12/2012 | Enomoto et al. |
| 2013/0135722 | A1 | 5/2013 | Yokoyama |
| 2014/0078592 | A1 | 3/2014 | Hotta et al. |
| 2015/0042951 | A1 | 2/2015 | Stanga et al. |
| 2016/0150201 | A1* | 5/2016 | Kilcher ................ G02B 26/105 |
| | | | 348/745 |
| 2017/0189228 | A1 | 7/2017 | Yang et al. |

FOREIGN PATENT DOCUMENTS

| | | |
|---|---|---|
| JP | H08-179312 | 7/1996 |
| JP | H08-313844 | 11/1996 |
| JP | H09-026554 | 1/1997 |
| JP | 2003-315726 | 11/2003 |
| JP | 2003-344010 | 12/2003 |
| JP | 2005-055780 | 3/2005 |
| JP | 2006-330720 | 12/2006 |
| JP | 2008-165116 | 7/2008 |
| JP | 2010-211148 | 9/2010 |
| JP | 2010-243809 | 10/2010 |
| JP | 2011-215397 | 10/2011 |
| JP | 2012-208227 | 10/2012 |
| JP | 2013/007967 | 1/2013 |
| JP | 2013-114021 | 6/2013 |
| JP | 2014-059395 | 4/2014 |
| JP | 2015-033472 | 2/2015 |
| JP | 2015-526187 | 9/2015 |
| JP | 2017-215397 | 12/2017 |
| JP | 2017-538145 | 12/2017 |

OTHER PUBLICATIONS

Shrestha, Pawan K et al. "Accommodation-Free Head Mounted Display with Comfortable 3D Perception and an Enlarged Eyebox." Research (Washington, D.C.) vol. 2019 9273723. Aug. 25, 2019, doi: 10.34133/2019/9273723 (Year: 2019).*

International Search Report for PCT/JP2020/013371 mailed on Jun. 23, 2020.

Office Action dated Dec. 8, 2020(Japanese Patent Application No. 2020-542360).

Anonymous: "Ø ½ Lens Tubes", Oct. 27, 2015 (Oct. 27, 2015), pp. 1-3, XP055979391, Retrieved from the Internet: URL: https://web.archive.org/web/20151027093955/http://www.thorlabs.de/newgrouppage9.cfm?objectgroup_ID=3306 [retrievd on Nov. 9, 2022] *section "Features"; p. 1.

Anonymous: "Luminance—Wikipedia", Dec. 28, 2018 (Dec. 28, 2018), pp. 1-5, XP055979302, Retrieved from the Internet: URL https://web.archive.org/web/20181228232731/https://en.wikipedia.org/wiki/Luminance [retrieved on Nov. 9, 2022] *section "Explanation"; p. 1.

Extended European Search Report dated Nov. 23, 2022 with respect to the corresponding European patent application No. 20778584.1.

* cited by examiner

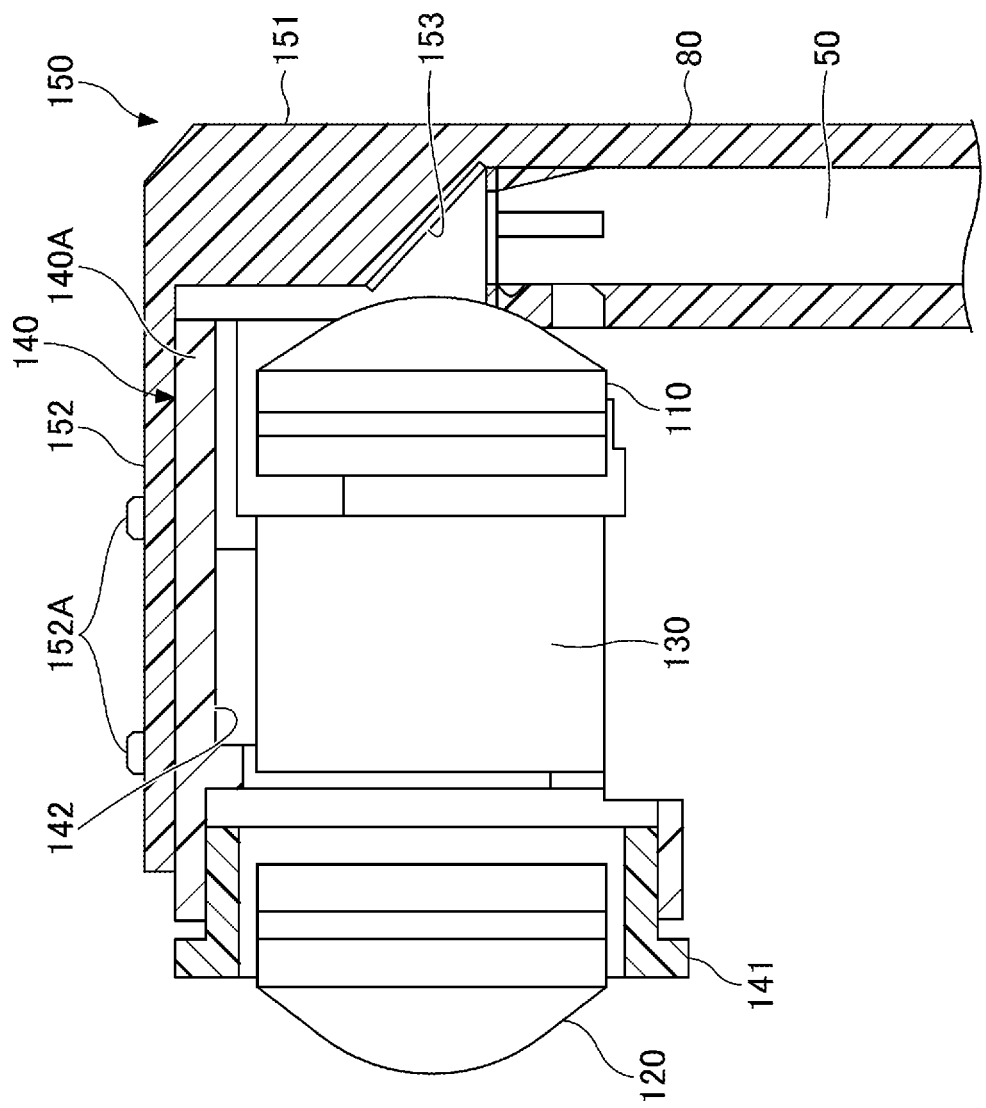
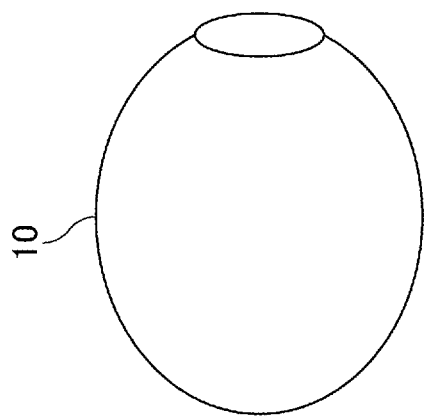
FIG.4

FIG.10A
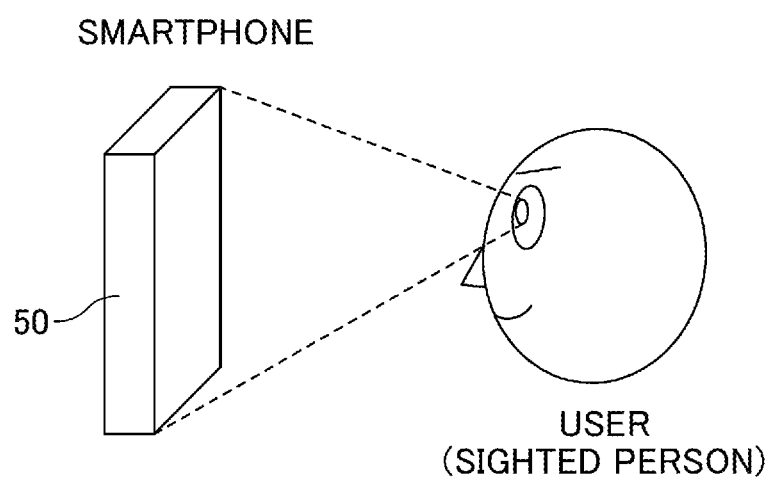
SMARTPHONE
50
USER
(SIGHTED PERSON)
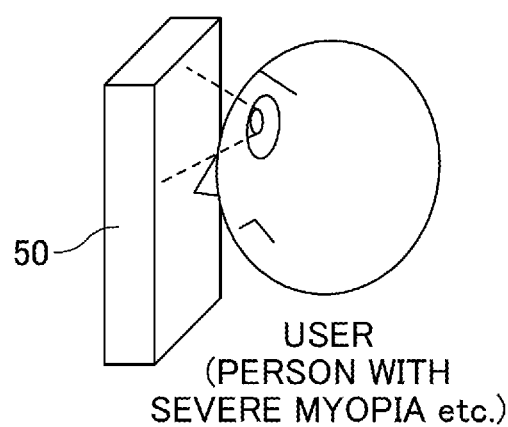
50
USER
(PERSON WITH
SEVERE MYOPIA etc.)

FIG.12

| FOVH | TRANSMITTANCE OF LIGHT | | | AMOUNT OF LIGHT |
|---|---|---|---|---|
| | 360A | 360B | 360C | |
| 40 deg. | 2.2% | 2.2% | 2.2% | 0.639 $\mu$W |
| 60 deg. | 2.2% | 2.2% | 4.6% | 1.34 $\mu$W |

FIG.27
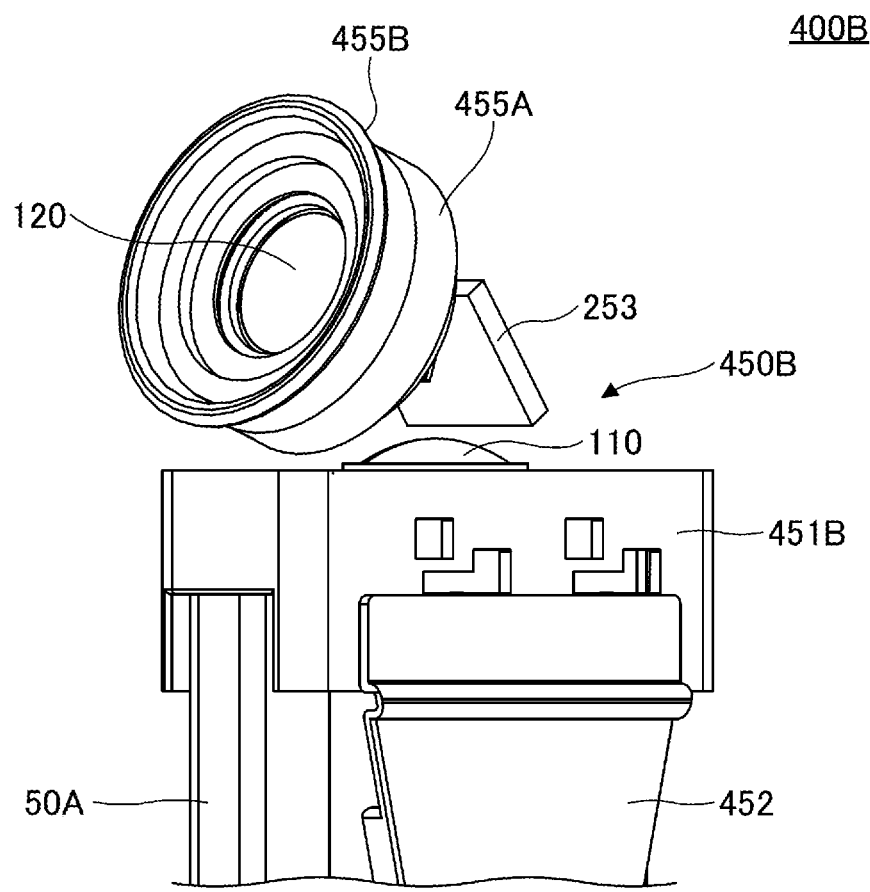
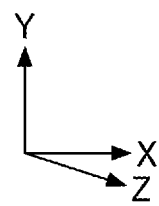

IMAGE RELAY DEVICE AND IMAGE PROJECTION SYSTEM

TECHNICAL FIELD

The present disclosure relates to image relay devices and image projection systems.

BACKGROUND ART

Smartphones 50 or tablet terminals have become widespread as means for acquiring and displaying various types of information as illustrated in FIG. 10A. When a user is to view a screen displayed on these, a sighted person (a person who is not visually impaired and is able to obtain a certain degree of vision with corrective means such as eyeglasses even if eyesight is poor) can visually recognize everything on the screen by viewing the screen at a certain distance from the screen.

However, even though a person with severe myopia or a person with visual impairment and poor eyesight can focus on the screen and visually recognize by bringing their eyes (face) closer, only a part of the screen is in the field of view, and the entire screen cannot be visually recognized at one time.

Further, as illustrated in FIG. 10B, a projection device (projector) 1 that projects an image on the screen 1A or a wall instead of the screen of the terminal can enlarge a display by increasing a distance to the screen 1A. In this case, as well, it is difficult for a person with poor eyesight to focus on an see the projection display.

Recently, such projectors in which an information terminal such as a smartphone is equipped with a projector function (for example, see Patent Document 1) and projector devices of similar size to a smartphone are on the market.

On the other hand, a device is provided that assists vision of an individual with visual impairment who has a retina with reduced function by compensating for reduced and/or unequal retinal function. This device includes a light source that emits laser light, a scanner that scans the laser light emitted from the light source, and a projection optical component that projects the laser light scanned by the scanner onto the retina. This device is connected to a remote module via a cable and projects the laser light corresponding to an image output from the remote module onto the retina (for example, see Patent Document 2).

CITATION LIST

Patent Document

[Patent Document 1] Japanese Patent Application Publication No. 2006-330720
[Patent Document 2] Japanese Patent Application Publication No. 2015-526187

SUMMARY OF INVENTION

Technical Problem

However, with the conventional projection device disclosed in Patent Document 1, which includes the light source and the scanner and projects an image from a main body of the device, it is difficult for a person with poor eyesight to focus and view the entire screen.

Further, the conventional device disclosed in Patent Document 2, which emits laser light according to the image input from the remote module and projects the image onto the retina, does not project laser light representing an image emitted from the projection device onto the retina.

In consideration of the above, an object of the present invention is to provide an image relay device capable of visually recognizing an entire image in focus even for a person with poor eyesight by projecting laser light representing an image emitted from a projection device that projects an image onto the viewer's retina.

Solution to Problem

An image relay device according to the embodiment of the present invention includes a projection device, a first optical member, and a second optical member. The projection device includes a light source configured to emit laser light and a scan unit configured to scan the laser light based on image data. The first optical member receives the image light from the projection device and converts the image light, which is parallel light, to light beams of convergent light. The second optical member converts the light beams output from the first optical member into parallel light.

Advantageous Effects of Invention

An image relay device that projects laser light representing an image emitted from a projection device onto the retina can be provided.

BRIEF DESCRIPTION OF DRAWINGS

FIG. 4 is a diagram illustrating a cross-section taken along the arrows A-A of FIG. 1;
FIG. 10A is a diagram illustrating a usage status of a conventional smartphone;
FIG. 12 is a diagram illustrating the relationship of Field Of View Horizontal (FOVH), light transmittance, and amount of light.

FIG. 27 is a diagram illustrating the image relay device 400B of the second modification of Embodiment 4;

DESCRIPTION OF EMBODIMENTS

Hereinafter, embodiments to which an image relay device of the present invention is applied will be described.

Embodiment 1

Figure 1A:
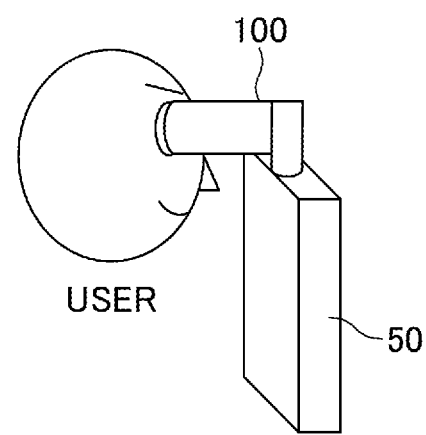
FIG. 1A is a diagram illustrating a usage example of an image relay device 100 according to Embodiment 1.

FIG. 1A is a diagram illustrating a usage example of an image relay device 100 according to Embodiment 1. A smartphone 50 is, for example, a smartphone having a projector function of scanning and projecting an image, and is an example of a projection device. An image relay device 100 is installed at a position where the image is projected from the smartphone 50. The image relay device 100 projects a projected image onto the user's retina by the Maxwellian view.

Figure 1B:
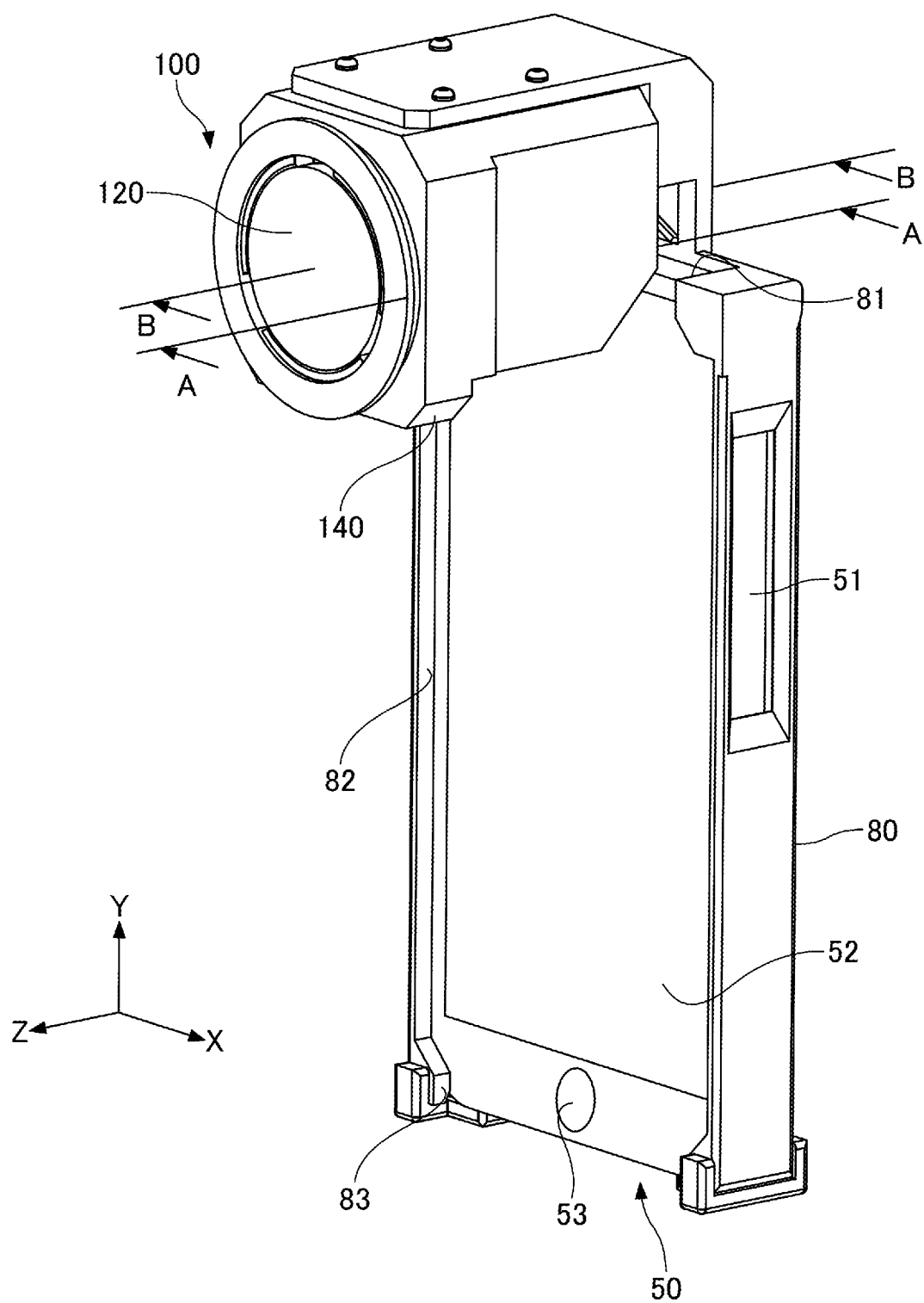
FIG. 1B is a diagram illustrating an example of the image relay device 100 according to Embodiment 1.

FIG. 1B is a diagram illustrating an example of the image relay device 100 according to Embodiment 1. As an example, the image relay device 100 is attached to the smartphone 50 including a laser emitting unit 60. Hereinafter, the image relay device 100 according to Embodiment 1 will be described with reference to FIG. 2 to FIG. 7 in addition to FIG. 1A and FIG. 1B. Further, in the following, the description will be made using an XYZ Cartesian coordinate system.

Figure 2:
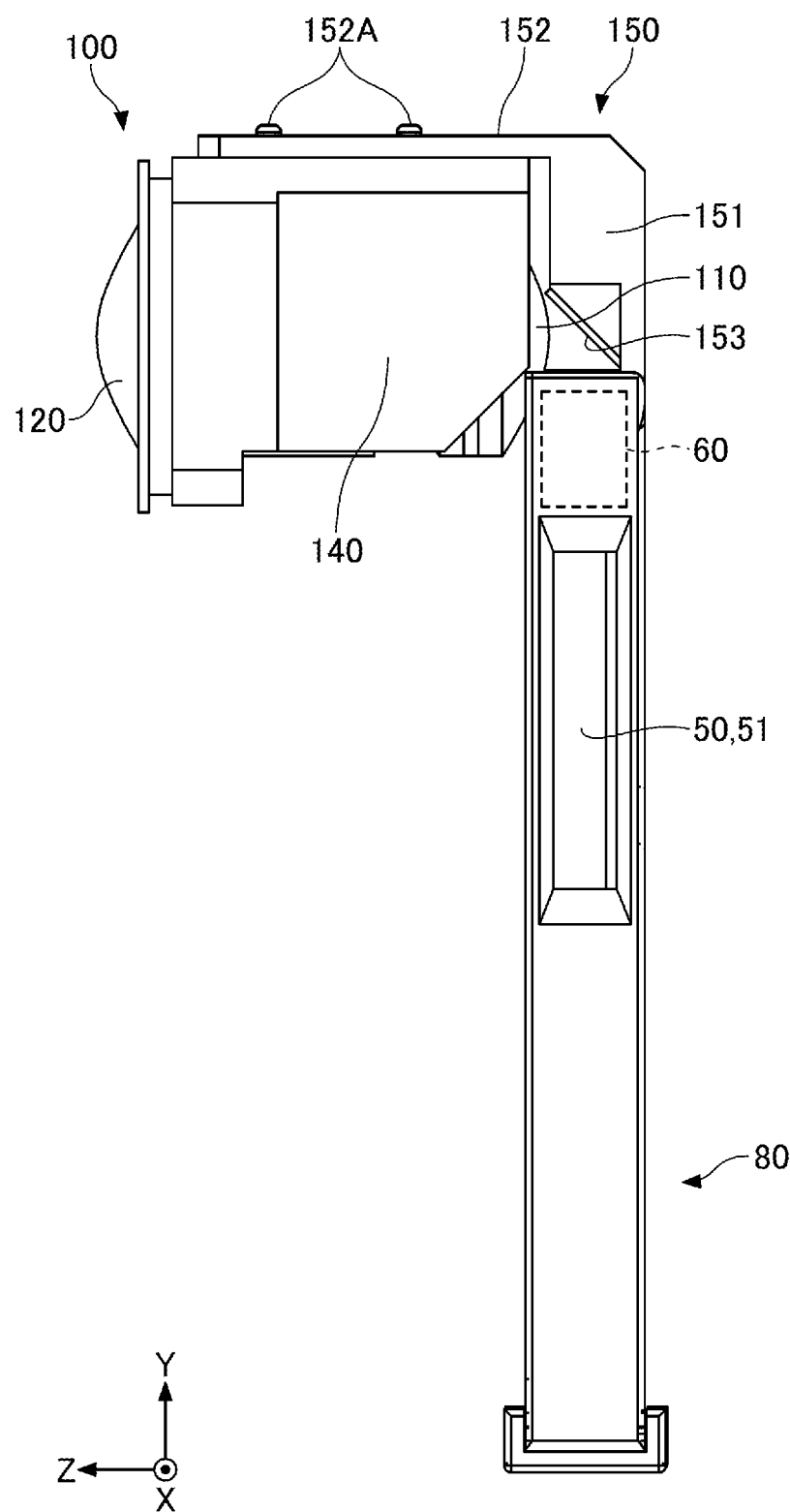
FIG. 2 is a side view illustrating the image relay device 100.
Figure 3:
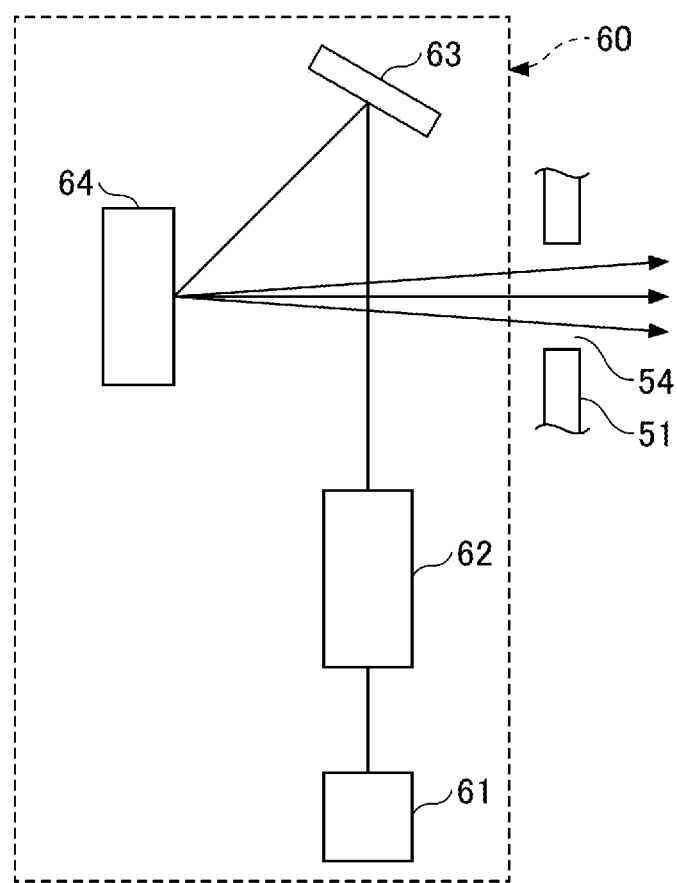
FIG. 3 is a diagram illustrating a laser emitting unit 60.
Figure 5:
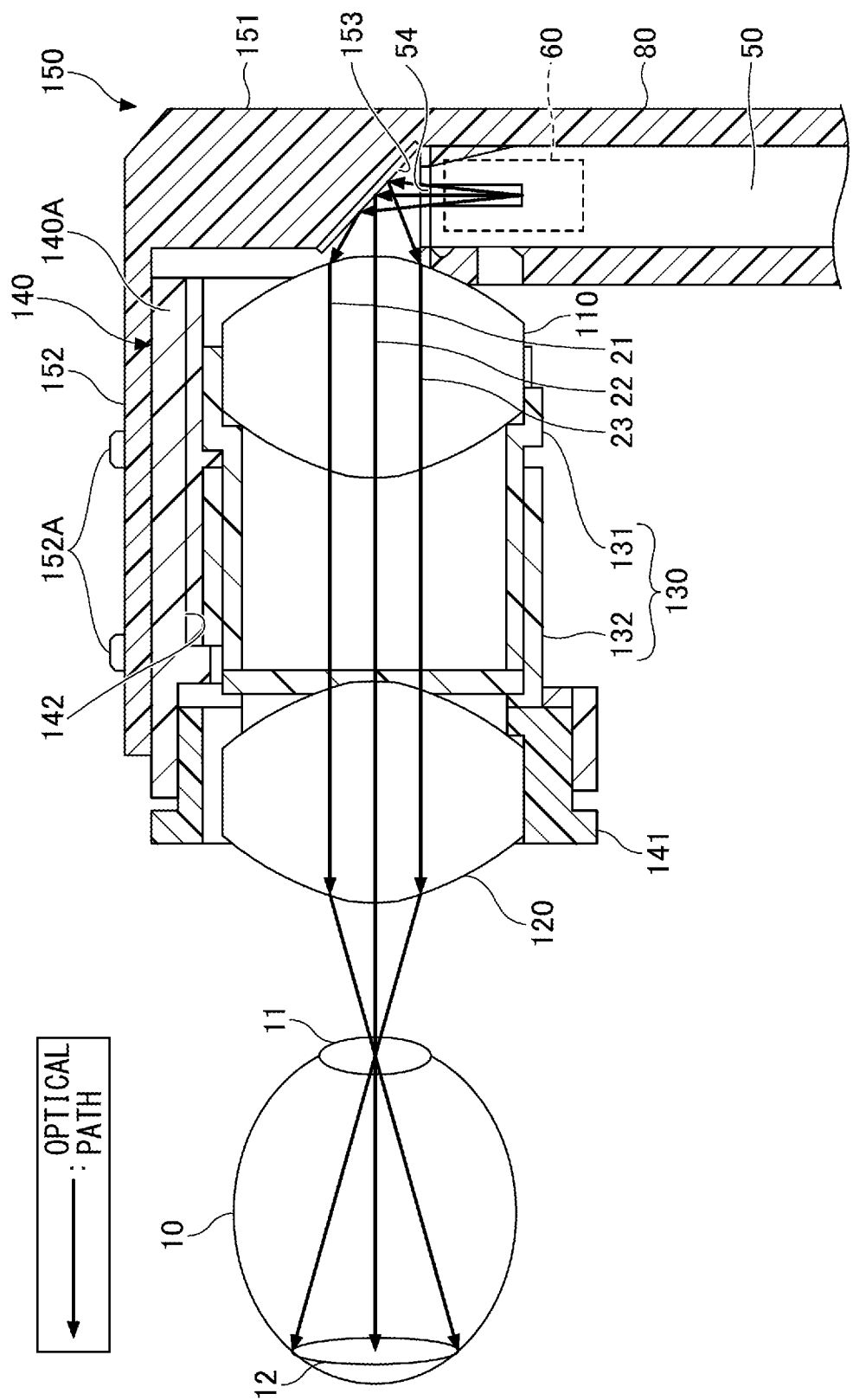
FIG. 5 is a diagram illustrating a cross-section taken along the arrows B-B of FIG. 1.

FIG. 2 is a side view illustrating the image relay device 100. FIG. 3 is a diagram illustrating the laser emitting unit 60. FIG. 4 is a diagram illustrating a cross-section taken along the arrows A-A of FIG. 1. FIG. 5 is a diagram illustrating a cross-section taken along the arrows B-B of FIG. 1.

As illustrated in FIG. 1B and FIG. 2, the smartphone 50 includes a housing 51, a display 52, a home button 53, and the laser emitting unit 60. The housing 51 is provided on a position of an outer surface of the smartphone 50 other than the display 52. The display 52 is provided on a +Z side surface parallel to the XY plane in a state of being superposed on a touch panel. The home button 53 is provided at the end of the display 52 on the −Y direction side and at the center in the X direction.

In the following, among the outer surfaces of the smartphone 50, surfaces excluding the surface parallel to the XY plane on the +Z direction side where the display 52 is located and the surface parallel to the XY plane on the −Z direction side opposite to the display 52 is referred to as side surfaces of the smartphone 50.

The laser emitting unit 60 emits laser light in the +Y direction from an opening 54 (see FIG. 5) provided on the side surface of the housing 51 of the smartphone 50 on the +Y direction side. The laser light emitted by the laser emitting unit 60 is laser light capable of projecting an image.

The laser emitting unit 60 is built in the smartphone 50 as an emitting unit of a projector (a pico projector). The laser light is emitted from the laser emitting unit 60 with the +Y direction of the side surface of the smartphone 50 facing the screen or the like, and an image is projected on the screen or the like.

As illustrated in FIG. 3, the laser emitting unit 60 includes a light source 61, an adjusting unit 62, a plane mirror 63, and a scan unit 64. The light source 61 is a light source that emits visible laser light such as red laser light, green laser light, and blue laser light. The adjusting unit 62 is an adjusting unit of an optical system that adjusts the numerical aperture (NA) and/or a beam diameter. The scan unit 64 is, for example, a two-axis Micro Electro Mechanical Systems (MEMS) mirror. The plane mirror 63 is a total reflection mirror.

As illustrated in FIG. 3, in the laser emitting unit 60, the numerical aperture (NA) and/or the beam diameter of the laser light emitted by the light source 61 is adjusted. The adjusted laser light is reflected by the plane mirror 63 and scanned two-dimensionally by the scan unit 64. The scanned laser light is emitted from the opening 54 in the +Y direction of the smartphone 50. The scan unit 64 vibrates at a relatively high frequency such as 28 kHz such that an image of 60 frames is projected per second.

As illustrated in FIG. 1B and FIG. 2, the smartphone 50 is attached with a case 80 that covers a portion other than the display 52. The case 80 is a so-called jacket, and is made of, for example, resin. A holder 150 is provided at the end of the +Y direction side of the case 80.

As illustrated in FIG. 1B, the case 80 includes notches 81, 82, 83. The notch 81 is provided in a portion corresponding to the side surface of the +Y direction side of the smartphone 50. The notch 81 is a portion cut out so that the case 80 does not cover the side surface of the +Y direction side of the smartphone 50, and is a portion that does not cover an opening 54 of the smartphone 50. The holder 150 is integrally molded with the case 80 as an example, and extends so as to rise from the edge of the notch 81 in the +Y direction.

As illustrated in FIG. 1B, the notch 82 is a portion cut out so as not to cover the display 52, and communicates with the notch 81. Further, the notch 83 is provided in a portion corresponding to the side surface of the −Y direction side of the smartphone 50, and communicates with the notch 82.

As illustrated in FIG. 2 and FIG. 4, the image relay device 100 includes lenses 110 and 120, a lens barrel 130, and a housing 140. A holder 150 is attached to the case 80. The lenses 110 and 120 are fixed by the housing 140 and the lens barrel 130, and are held by the holder 150 via the housing 140 and the lens barrel 130. In other words, the holder 150 holds the housing 140 and the lens barrel 130 for fixing the lenses 110 and 120. The holder 150 is an example of a holding unit.

Although a structure in which the holder 150 is not included in the image relay device 100, but instead integrated with the case 80 will be described here, the holder 150 may be a component included in the image relay device 100.

The holder 150 holds the lenses 110, 120, the housing 140, and the lens barrel 130 so as to be arranged at a position away from the display 52 so that the lenses 110, 120, the housing 140, and the lens barrel 130 do not overlap the display 52. This is to avoid obstructing the view of the display 52 for a person who does not have a visual abnormality.

As illustrated in FIG. 1B and FIG. 2, the holder 150 includes a base portion 151 rising in the +Y direction from the edge of the notch 81, an extending portion 152 extending in the +Z direction from the +Y direction end of the base portion 151, a mirror 153 provided on base portion 151.

The base portion 151 and the extending portion 152 are made of resin and integrally molded. The mirror 153 is a total reflection mirror having a reflection surface parallel to a plane in which the XY plane is rotated to the XZ plane 45° counterclockwise when viewed in FIG. 2 on the +Z direction side of the base 151. The mirror 153 reflects the laser light emitted in the +Y direction from the opening 54 (see FIG. 3) of the smartphone 50 to the +Z direction to enter into the lens 110.

Here, a configuration in which the holder 150 is integrally molded with the case 80 and the holder 150 is fixed to the smartphone 50 via the case 80 will be described. However, the holder 150 may be formed separately from the case 80 and may be fixed to the case 80, or may be fixed to the housing 51 or the like of the smartphone 50 without going through the case 80.

The lens 110 is an example of a first optical member, and is fixed to a lens barrel portion 131 (an example of a first holding unit) of the lens barrel 130 (see particularly FIG. 4 and FIG. 5). The lens barrel portion 131 for fixing the lens 110 is fixed to the housing 140.

As illustrated in FIG. 5, image light 21, 22, and 23, which is parallel light emitted from the laser emitting unit 60 and reflected by the mirror 153, are incident on the lens 110. The image light 21, 22, and 23 are light beams of the scanned image light at different times. The lens 110 is an optical member that converts light beams scanned by the scan unit 64 of the laser emitting unit 60 so that the optical axes of the light beams are parallel and each light beam becomes a convergent light.

The lens 120 is an example of a second optical member, and is fixed to a lens barrel portion 132 (an example of a second holding unit) of the lens barrel 130 (see particularly FIG. 4 and FIG. 5). An annular screw portion 141 is attached to the outer peripheral portion of the lens 120. The screw portion 141 is an annular member in which a screw is cut on the outer peripheral surface, and is bonded with the lens 120 embedded on the inner peripheral side. The lens 120 is installed in the housing 140 so that the position of the lens 120 can be adjusted by the screw portion 141.

The light beams of the image light 21, 22, and 23 emitted from the lens 110 are incident on the lens 120. The lens 120 converts each light beam transmitted from the lens 110 into parallel light, and refracts the light beams of the image light 21, 22, and 23 so as to converge into a point in proximity of the center of a pupil 11. As illustrated in FIG. 4 and FIG. 5, the lens 120 is an eyepiece that transmits laser light to a viewer's eyeball. The lens barrel 130 includes the lens barrel portions 131 and 132. Each of the lens barrel portions 131 and 132 is a cylindrical member on which the lenses 110 and 120 are installed. As illustrated in FIG. 5, the lens barrel portions 131 and 132 are nested and fixed to each other.

The lens 110 is fixed in a state of being embedded inside the lens barrel portion 131 at the end portion of −Z direction side of the lens barrel portion 131. The lens 110 may adhere to the lens barrel portion 131.

As illustrated in FIG. 4 and FIG. 5, the screw portion 141 (an example of a position adjusting unit) is the annular member in which a screw is cut on the outer peripheral surface, and is adhered to the outer peripheral portion of the lens 120. The screw portion 141 fixes the lens 120. The lens 120 may be moved back and forth in the optical axis direction (+Z direction) by rotating the screw portion 141.

The beam diameter of the image light (laser light) emitted from the smartphone 50 connected to the image relay device 100 may differ depending on the type of the smartphone. If the beam diameter of the laser light is different, the focus due to the Maxwellian view may shift slightly.

With the Maxwellian view projection, the same visual acuity can be obtained regardless of the user's vision without correction, which is called focus-free. However, if the beam diameter of the laser light is increased, the visual acuity acquired by the Maxwellian view may change depending on the visual acuity (refractive index of a crystalline lens) of the user.

In order to cope with this, the screw portion 141 is provided. By moving the lens 120 back and forth in the optical axis direction (+Z direction) to change the distance between the lens 110 and the lens 120, the focus-free can be realized with higher accuracy according to the beam diameter of the laser light emitted from the smartphone 50.

Figure 6:
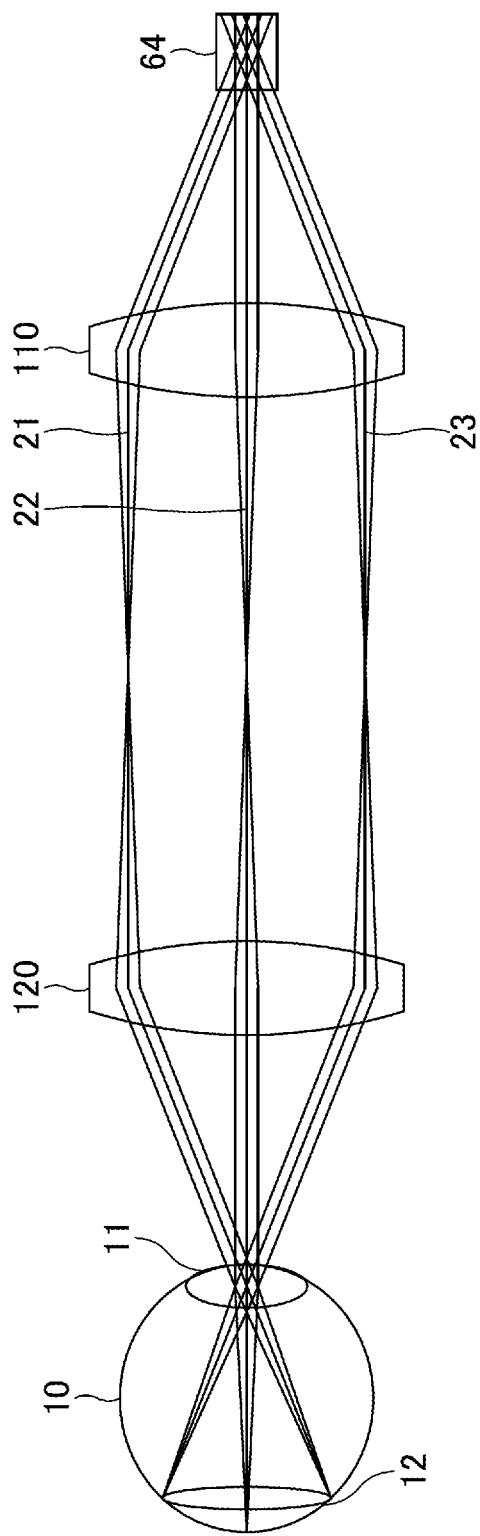
FIG. 6 is a diagram illustrating the relationship between FOV and resolution in the image relay device 100.

FIG. 6 is a diagram illustrating a relationship between field of view (FOV) (viewing angle) and resolution in the image relay device 100. The scan unit 64, the lenses 110 and 120, the pupil 11, and the retina 12 are illustrated in FIG. 6. By changing the numerical aperture (NA) of the lens 120 to change magnification, the viewing angle of the image projected on the retina 12 can be enlarged or reduced. Increasing the NA increases the viewing angle, and decreasing the NA decreases the viewing angle.

The diameter of the MEMS mirror used as the scan unit 64 is assumed to be 1.0 mm and the horizontal viewing angle is assumed to be approximately 40°. For example, if the magnification of the pair of lenses 110 and 120 is changed so that the viewing angle is twice the horizontal viewing angle of the MEMS mirror, the viewing angle is doubled to 80°, and the beam diameter is halved. That is, the beam diameter on the retina 12 is doubled. In this way, the viewing angle and resolution of the image projected on the retina 12 can be adjusted by changing the NA numerical aperture (NA) of the lenses 110 and 120 to change the magnification.

Next, an optical operation of the image relay device 100 as described above will be described with reference to FIG. 5 and FIG. 6.

Each light beam of the image light 21, 22, and 23 emitted from the laser emitting unit 60 of the smartphone 50 is a light beam scanned by the scan unit 64 of the laser emitting unit 60, which is the scanned image light at different times. In FIG. 6, a straight line at the center indicates the optical axis of the light beam, straight lines on both sides indicate the ends of the light beam, and the distance between the straight lines on both sides corresponds to the diameter of the light beam.

The optical axis of each light beam emitted from the laser emitting unit 60 is diffused, and each light beam is approximately parallel light.

Each of these light beams is reflected by the mirror 153 and guided to the lens 110, and is converted by the lens 110 so that the optical axes of each light beam are parallel and each light beam becomes the convergent light.

Each light beam converted into the convergent light by the lens 110 propagates inside the lens barrel 130 and is incident on the lens 120. At this time, each light beam is focused at the approximately center of the lens 110 and the lens 120.

The lens 120 converts each light beam into parallel light and refracts each light beam so as to converge in proximity to the center of the pupil 11 of the user's eyeball 10 on the outside (+Z direction side) of the lens 120 so that the light beams are incident on the pupil 11.

The lens 120 converts each light beam into parallel light so that each light beam incident on the pupil 11 is focused to be imaged on the retina 12 according to the characteristics in the user's eyeball.

As a result, the projected image rays projected from the projection device such as the smartphone 50 can be projected onto the retina in a focus-free manner by the Maxwellian view.

Here, the optical system including the lenses 110 and 120 may have a conjugate relationship between a scanning origin of the scan unit 64 which is a MEMS mirror and the center of an iris (the center of the pupil 11). Further, the optical system including the lenses 110 and 120 may have a conjugate relationship between the light source 61 and the retina 12. By having such a relationship, the laser light emitted by the light source 61 and scanned by the scan unit 64 according to the image data is imaged on the retina 12.

Figure 7:
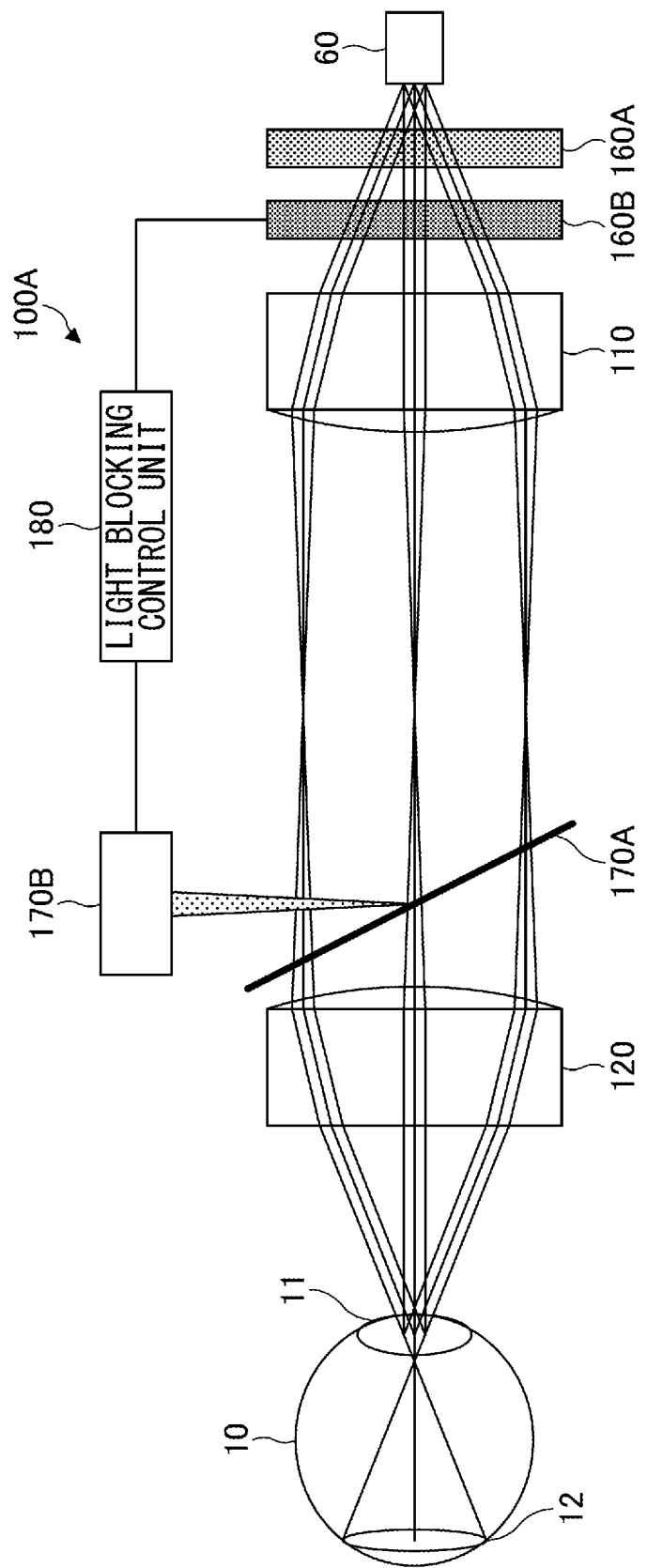
FIG. 7 is a diagram schematically illustrating the configuration of an image relay device 100A.

Further, if the output of the laser light emitted by the laser emitting unit 60 of the smartphone 50 is not adjusted and is incident on the retina 12, the output may be too high. In such a case, the configuration as illustrated in FIG. 7 may be used. FIG. 7 is a diagram schematically illustrating a configuration of an image relay device 100A.

The image relay device 100A has a configuration in which a Neutral Density (ND) filter 160A (a type of attenuation filter), a liquid crystal shutter 160B, a half mirror 170A, a Photo Detector (PD) 170B, and a light blocking control unit 180 are added to the image relay device 100. In addition to these, only the lenses 110, 120 and the laser emitting unit 60 are illustrated in FIG. 7 and other components are omitted.

The ND filter 160A and the liquid crystal shutter 160B are sequentially arranged on the optical path between the laser emitting unit 60 and the lens 110. The ND filter 160A is a filter that reduces the amount of laser light incident from the laser emitting unit 60. The liquid crystal shutter 160B is an optical device in which opening/closing control is performed by the light blocking control unit 180, and the amount of transmitted light is adjusted by adjusting the opening duration. As an example, the ND filter 160A and the liquid crystal shutter 160B may be held by the holder 150 and provided on the front side of the mirror 153 or may be held by the housing 140 and provided in front of the lens 110. If the reduction in the amount of laser light by the ND filter 160A is sufficient, the liquid crystal shutter 160B may be omitted to simplify the device configuration. The ND filter 160A can be installed at any position on the optical path from when the laser light is incident to the image relay device 100 to when the laser light is emitted to the viewer's eyeball 10.

The half mirror 170A is provided on the optical path between the lenses 110 and 120, transmits a part of the light, and reflects the remaining light toward the PD 170B. The amount of light to be reflected toward the PD 170B may be a small portion of the incident light.

The PD 170B detects the amount of laser light reflected by the half mirror 170A and outputs a signal indicating the amount of light to the light blocking control unit 180. The PD 170B is an element that converts light into an electric signal by utilizing photoelectric conversion.

The light blocking control unit 180 controls the opening/closing of the liquid crystal shutter 160B based on the signal representing the amount of light input from the PD 170B. The light blocking control unit 180 closes the liquid crystal shutter 160B when the amount of laser light transmitted through the liquid crystal shutter 160B is detected to exceed a level (for example, approximately 0.39 μW) not causing any problem even if the laser light is directly incident on the human retina.

For example, a microcomputer can be used as the light blocking control unit 180. A battery may be included as a power source for supplying electric power to the microcomputer, and the electric power may be supplied from the smartphone 50. The microcomputer may be held by, for example, the holder 150. If a battery is provided, the battery may also be held by, for example, the holder 150.

As described above, in the image relay device 100, the laser light emitted from the laser emitting unit 60 is reflected by the mirror 153, and the amount of light is adjusted by the ND filter 160A and the liquid crystal shutter 160B. Then, the laser light passes through the lenses 110 and 120, which is incident on the pupil 11 of the user's eyeball 10 to form an image on the retina 12.

Therefore, even with a general-purpose projection device such as the smartphone 50, the image relay device 100 that projects laser light representing an image emitted from the projection device onto the retina 12 in a focus-free manner by the Maxwellian view can be provided.

When a person with visual impairment views the image of the smartphone 50, the person with visual impairment is obliged to bring the viewer's eyeball extremely close to the display 52 and partially visually recognize the image of the smartphone. If a Retinal Imaging Display (RID) device that includes laser light source and performs retinal projection is used, the visibility of the image obtained at the retina 12 is improved. However, in this case, the image data of the smartphone 50 is connected to the RID device via an HDMI (registered trademark) cable, and the RID device scans the laser light based on the image data, so connecting the RID device and smartphone 50 with the HDMI cable takes time and is complicated.

Further, when using a Head Mount Display (HMD) type RID device, an operation such as fitting to the head is required.

In contrast, the image relay device 100 is requires neither the use of the HDMI cable nor the performance an operation such the fitting to the head. By relaying the laser light emitted from the smartphone 50 including the laser emitting unit 60 by the image relay device 100, the image of the smartphone 50 can be projected onto the retina 12 easily and simply. The user of the image relay device 100 can directly view the image by the laser light output from the smartphone 50 via the image relay device 100, and can see the full screen with high image quality.

In the above, although the configuration in which the image relay device 100 includes the two lenses 110 and 120 has been described, multiple pairs of conjugate lenses may be provided in consideration of miniaturization and design of the device, image inversion, and the like. Further, as described with reference to FIG. 6, the viewing angle and the resolution may be adjusted by changing the magnification.

Further, although the configuration in which the image relay device 100 is attached to the smartphone 50 (the projection device) including the laser emitting unit 60 has been described above, the projection device is not limited to the smartphone 50. The projection device may be a tablet computer including the laser emitting unit 60, a small projector including the laser emitting unit 60, or the like.

Embodiment 2

Figure 8:
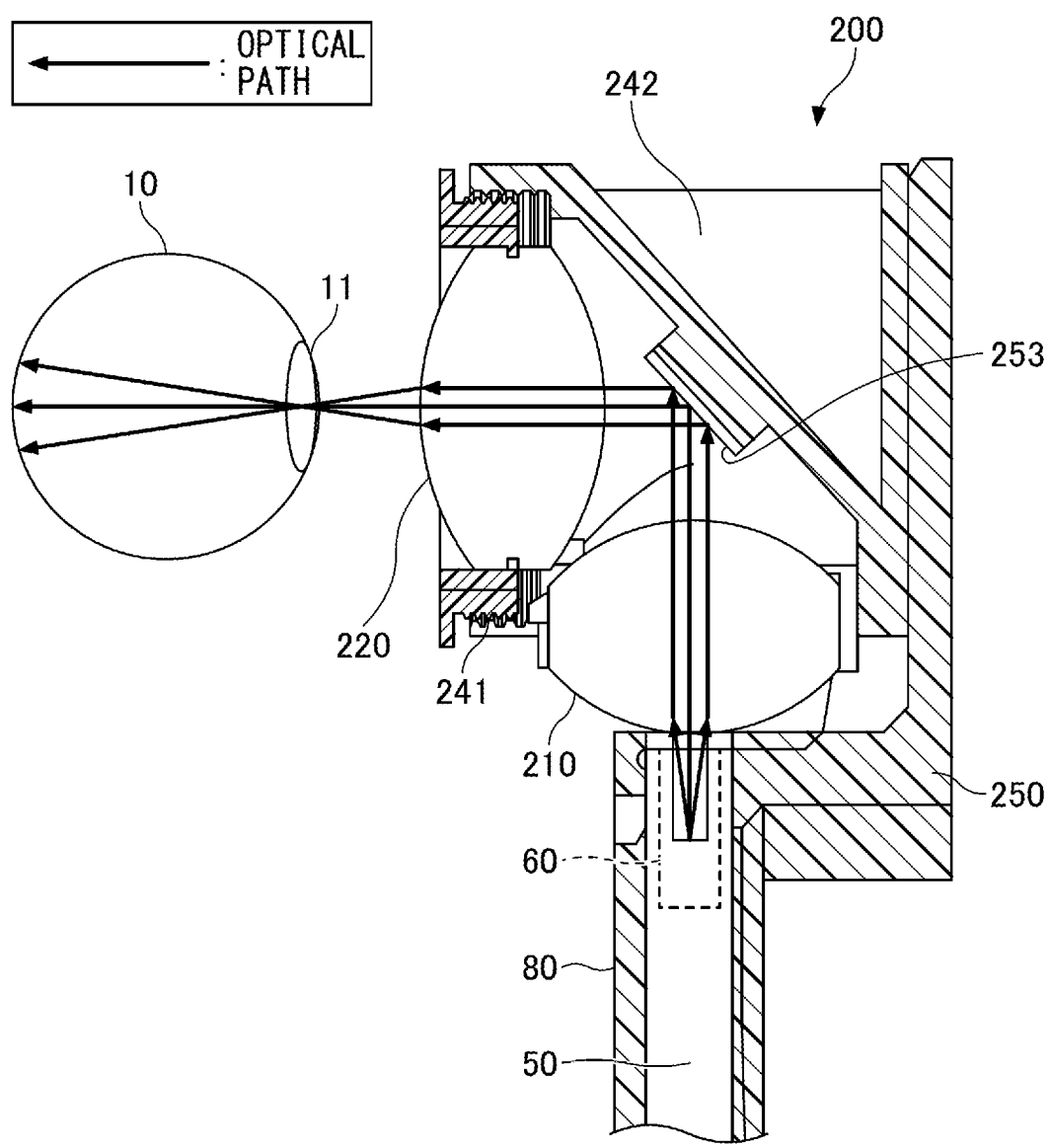
FIG. 8 is a diagram illustrating an image relay device 200 according to Embodiment 2, and the configuration and operation of the image relay device 200.

FIG. 8 is a diagram illustrating an image relay device 200 and configuration and operation of the image relay device 200 according to Embodiment 2.

In FIG. 8, the smartphone 50 is the projection device having the projector function as in Embodiment 1.

The image relay device 200 includes a lens 210, a lens 220, a mirror 253, a housing portion 242, and a screw portion 241.

The lens 210 is an example of the first optical member, and is fixed to a lens barrel (not illustrated) in the housing portion 242. The lens 210 is an optical member that converts the optical axes of the light beams of the image light projected from the smartphone 50 so that the optical axes of each light beam are parallel and each light beam becomes the convergent light.

The mirror 253 reflects the image light emitted from the lens 210 so as to bend the optical path. In FIG. 8, the reflection is performed at an approximately right angle.

The lens 210 is an example of the second optical member, and is fixed to a lens barrel (not illustrated) in the housing portion 242. The lens 220 converts the image light reflected by the mirror 253 into parallel light, refracts each light beam of the image light so as to converge into a point in proximity of the center of the pupil 11 of the eyeball 10.

The screw portion 241 fixes the lens 220 and moves the lens 220 back and forth in the optical axis direction (+Z direction).

The holder 250 connects the smartphone 50 and the image relay device 200, and is attached to the case 80 in the same manner as the holder 150 of Embodiment 1.

Next, the operation of the image relay device 200 according to Embodiment 2 will be described with reference to FIG. 8.

The image light (represented by three in the figure) emitted from the smartphone 50 and projected onto the viewer's eyeball 10 are the light beams of the scanned image light 21, 22, and 23 at different times.

Each light beam of the image light 21, 22, and 23 emitted from the smartphone 50 is the light beam scanned in the same manner as in Embodiment 1, and the light beams are scanned image light at different times. The optical axis of each light beam emitted from the smartphone 50 is diffused, and each light beam is approximately parallel light.

Each of the image light 21, 22, and 23 is incident on the lens 210, and is converted by the lens 210 so that the optical axes of each light beam are parallel and each light beam becomes the convergent light.

Each light beam converted into convergent light by the lens 210 is reflected by the mirror 253 in a direction approximately perpendicular to the lens 210, and is incident on the lens 220 arranged at an approximately right angle to the lens 210.

The lens 220 converts each light beam into parallel light and refracts each light beam so as to converge into a point in proximity to the center of the pupil 11 of the user's eyeball 10 on the outside (+Z direction side) of the lens 220 so that the light beams are incident on the pupil 11.

The lens 220 converts each light beam into parallel light so that each light beam incident on the pupil 11 is focused to be imaged on the retina 12 according to the characteristics in the user's eyeball.

As a result, the projected image rays projected from the projection device such as the smartphone 50 can be projected onto the retina in a focus-free manner by the Maxwellian view.

Similar to Embodiment 1, the screw portion 241 moves the lens 220 back and forth in the optical axis direction to change the distance from the lens 210 so that more accurate focus-free, according to the beam diameter of the laser light emitted from the smartphone 50, is implemented.

In the configuration of Embodiment 2, the mirror 253 is provided between the lens 210 and the lens 220 to reflect and bend the light beam at an approximately right angle. As a result, by arranging the lens 220 in a direction approximately perpendicular to the lens 210, the distance between the two lenses is shortened as compared with the configuration illustrated in Embodiment 1, so miniaturization can be implemented.

Further, in the second embodiment, although the configuration in which the lens 220 is approximately perpendicular to the lens 210 has been described, the angle of the lens 220 with respect to the lens 210 may be set to a value other than the approximately right angle, depending on usage status of the user, the size of the lens, and an arrangement relationship. The arrangement of the mirror 253 and the arrangement of the lens 220 may be freely varied.

Figure 9A:
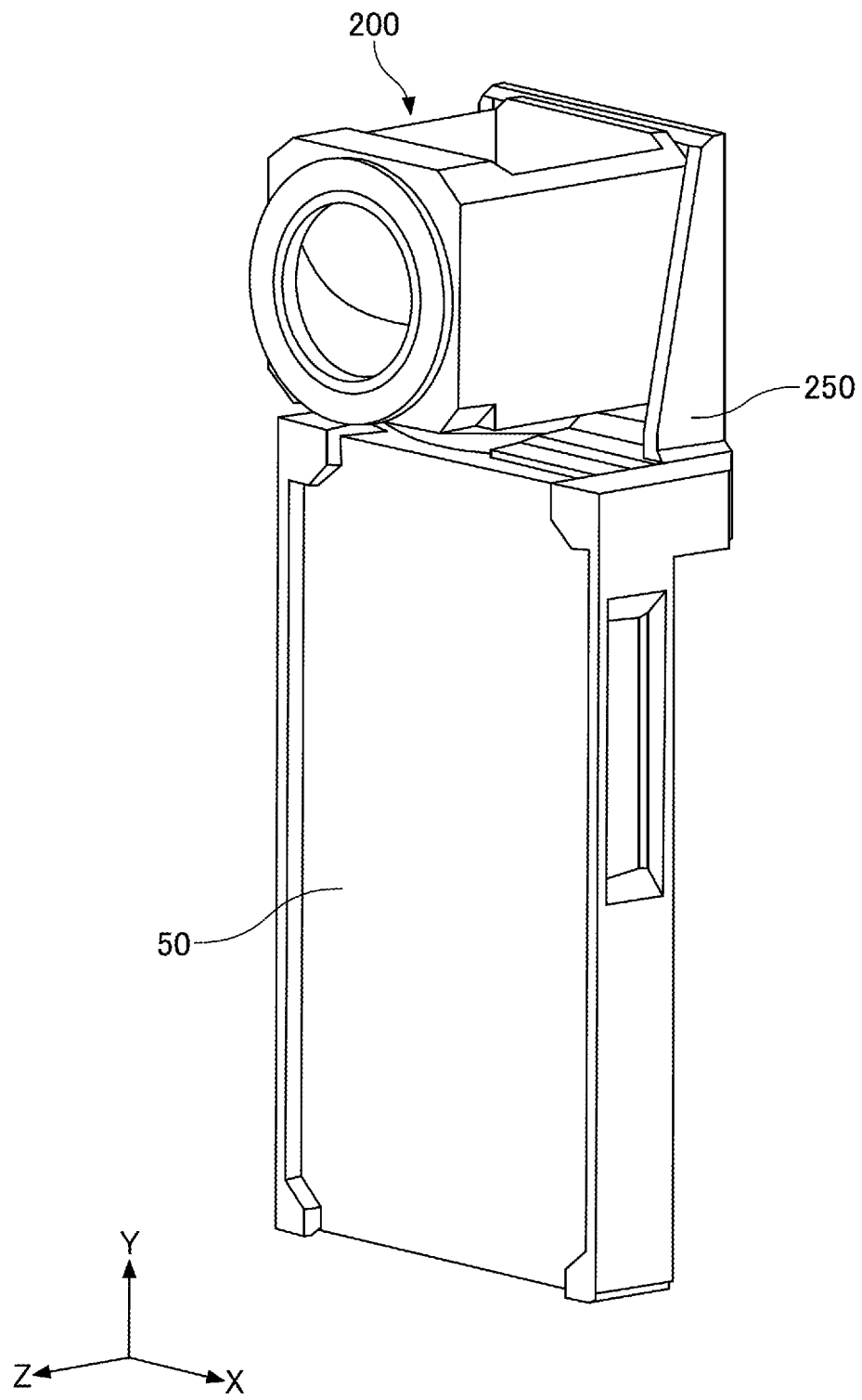
FIG. 9A is a perspective view of the image relay device 100 according to Embodiment 2.
Figure 9B:
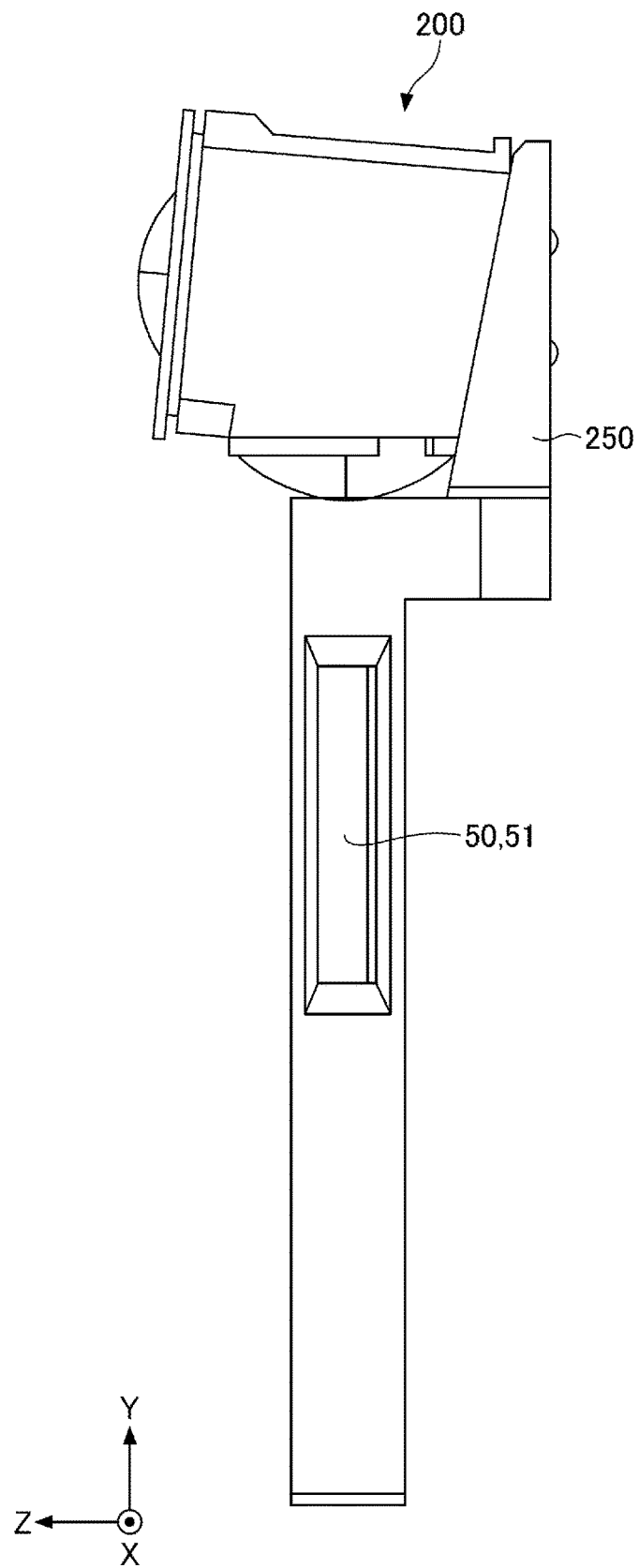
FIG. 9B is a side view of the image relay device 100 according to Embodiment 2.
Figure 10B:
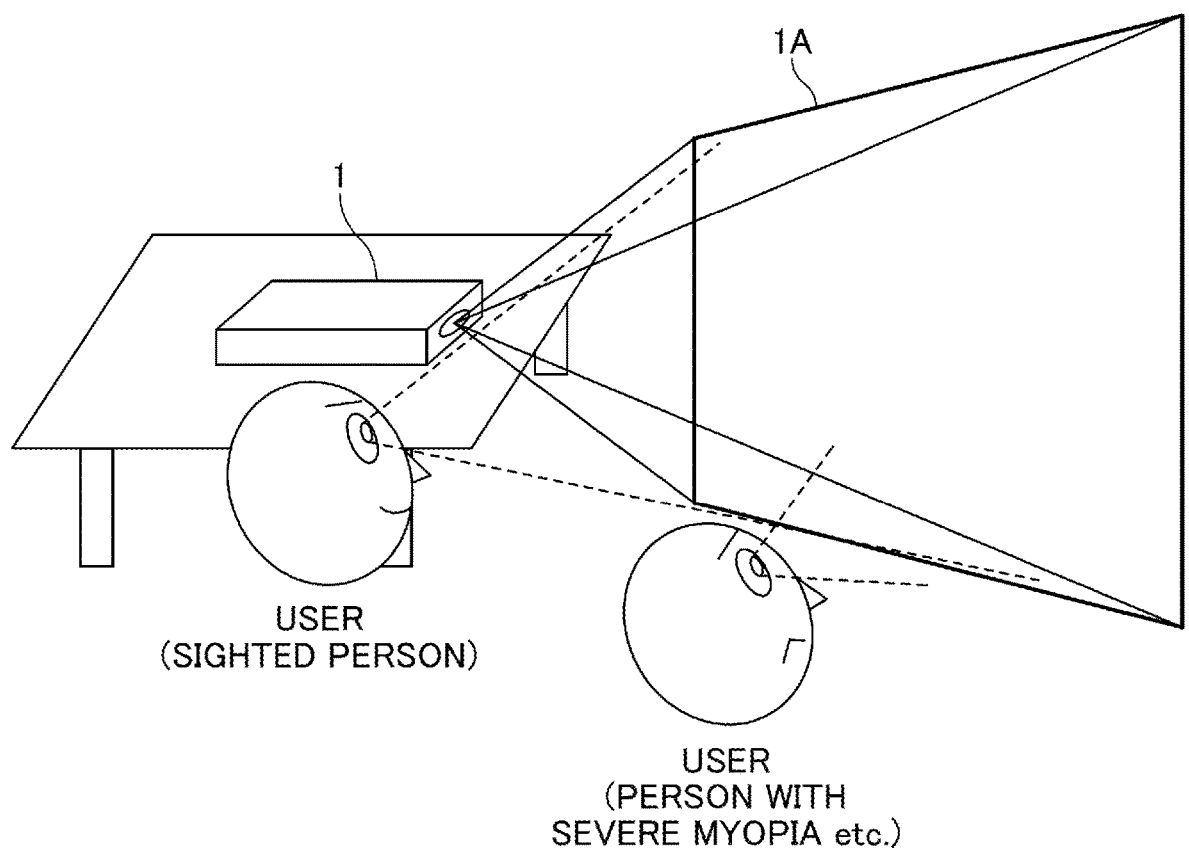
FIG. 10B is a diagram illustrating a usage status of a projection device that projects an image on a screen or a wall.

FIG. 9A and FIG. 9B are a perspective view and a side view of the image relay device 200 according to Embodiment 2. These figures illustrate a case where the image relay device 200 is installed at an angle of approximately 5° above (+Y direction) with respect to the smartphone 50. As illustrated in FIG. 9A and FIG. 9B, in Embodiment 2, a protrusion of the image relay device 200 is smaller than that of Embodiment 1 with respect to the smartphone 50.

As described above, similar to the image relay device 100 of Embodiment 1, in the image relay device 200, the laser light emitted from the laser emitting unit 60 is reflected by the mirror 253, passes through the lenses 210 and 220, is incident to the pupil 11 of the user's eyeball 10, and is imaged on the retina 12.

Therefore, even with a general-purpose projection device such as the smartphone 50, the image relay device 200 that projects laser light representing an image emitted from the projection device onto the retina 12 in a focus-free manner by the Maxwellian view can be provided.

Further, because the protrusion of the image relay device 200 with respect to the smartphone 50 is smaller, the image relay device 200 can be provided without interfering with the display 52 and is also more convenient for people with normal vision.

Embodiment 3

Figure 11:
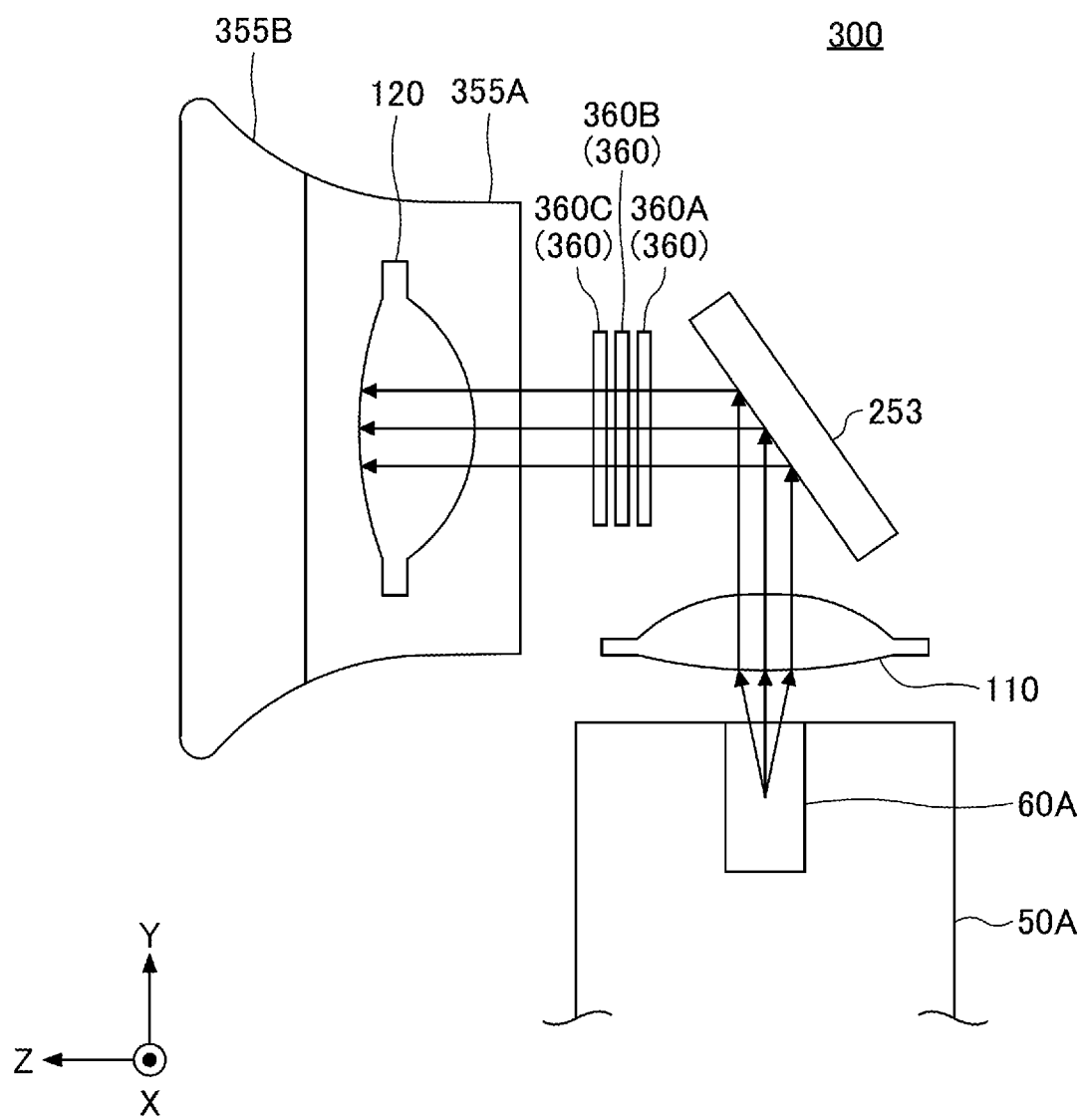
FIG. 11 is a diagram illustrating an image relay device 300 according to Embodiment 3.

FIG. 11 is a diagram illustrating an image relay device 300 according to Embodiment 3. FIG. 11 illustrates a cross-sectional structure corresponding to the B-B arrowhead of FIG. 1. The same components as those in Embodiment 1 and Embodiment 2 are designated by the same reference numerals, and the description thereof will be omitted.

The image relay device 300 is attached to a pico projector 50A including a laser emitting unit 60. The pico projector 50A includes a laser emitting unit 60A. The laser emitting unit 60A is the same as the laser emitting unit 60 of the smartphone 50 illustrated in FIG. 1A and the like.

The image relay device 300 includes a lens 110, a lens 120, a mirror 253, an ND filter 360A, 360B, 360C, a lens holder 355A, and a lens cover 355B. The lens 110, the mirror 253, and the ND filters 360A, 360B, and 360C are arranged inside a holder similar to the holder 150 of the image relay device 100 of Embodiment 1. The holder is omitted here.

The optical path is bent at an approximately right angle by the mirror 253 arranged between the lens 110 and the lens 120. Further, the lens 120 is held by the lens holder 355A. The lens cover 355B is attached to the +Z direction side of the lens holder 355A. The lens holder 355A and the lens cover 355B are part of the holder (not illustrated) of the image relay device 300. The angle of bending is not limited to such an angle, and for example, may be tilted in the Y direction as shown in FIG. 9B.

The three ND filters 360A, 360B, and 360C are arranged in series in this order from the mirror 253 side to the lens 120 side in the optical path between the mirror 253 and the lens 120. In the following, when the ND filters 360A, 360B, and 360C are not particularly distinguished, the ND filters 360A, 360B, and 360C are simply referred to as the ND filter 360.

The user of the image relay device 300 looks into the lens cover 355B to view the image. However, the output of the laser light output by the laser emitting unit 60A is, for example, several tens of mW, which is too strong for the user to view the image directly. In order to ensure the safety of the user, the image relay device 300 inserts three ND filters 360 in series in the optical path between the lens 110 and the lens 120.

Here, any two ND filters out of the three ND filters 360 have an attenuation rate suitable for Class 1 of IEC60825 (hereinafter, referred to as Class 1), which is a laser product safety standard. The reason why any two of the three ND filters 360 have the attenuation rate suitable for Class 1 is to ensure safety compliant with class 1 requirements with the remaining two ND filters 360A, 360B, 360C even if one of the three ND filters 360A, 360B, and 360C is damaged.

Further, the configuration in which three ND filters 360 are provided will be described, but the ND filter 360 may be greater than or equal to two. That is, when N is an integer greater than or equal to two, the image relay device 300 includes N ND filters 360, and Class 1 attenuation rate can be obtained with any N−1 ND filters 360 arranged in series.

Here, according to the standard determined by the safety of retinal projection equipment of the US Food and Drug Administration (FDA), as a Head Mount Display (HMD), the upper limit of the output of laser light that can be incident on the human retina without any problem is 0.39 µW.

In order to attenuate the laser light of several tens of mW emitted from the laser emitting unit 60A to 0.39 µW with multiple ND filters 360, the attenuation rate of multiple ND filters 360 becomes approximately 1/100,000.

In order to ensure safety even if one filter is damaged, more than two ND filters 360 are used. In order to implement the attenuation rate of 1/100,000 with two ND filters 360, one ND filter 360 is required to have the attenuation rate on the order of 0.01%. In particular, manufacturing is not easy with a view to mass production.

Further, when three ND filters 360 are used, the attenuation rate per filter is on the order of several percent, which is a realistic value. On the other hand, since the ND filter 360 is relatively expensive, the manufacturing cost of the image relay device 300 increases when four or more ND filters are used.

In consideration of the above, as an example, the number of ND filters 360 is best at three, and in Embodiment 3, the image relay device 300 includes three ND filters 360.

Further, the upper limit of the output of laser light that can be incident on the human retina without any problem is set to 0.31 µW when FOVH is general 26° including margin. The FOVH is the horizontal viewing angle of the image projected onto the retina. Converting the upper limit value by the area of the field of view, the value is approximately 0.639 µW at 40° FOVH and 1.34 µW at 60° FOVH. In the image relay device 300, as an example, the FOVH is assumed to be 40° or 60°.

Here, the laser light emitted by the laser emitting unit 60A includes RGB laser light. Of red (R), green (G), and blue (B) of light, B has the shortest wavelength and the highest energy, so the ratio of RGB is 2:1:0.7 as an example.

The color that requires the most attention in RGB is B, and if the safety of Class 1 in B is ensured, the safety of Class 1 can be ensured in R and G as well.

When the FOVH is 60°, the output of the laser light of B is 0.25 µW out of 1.3 µW in the three colors of RGB. That is, when the FOVH is 60°, the output of the laser light of B may be 0.25 µW preferably by being attenuated by three ND filters 360.

Here, in the case of 0.25 µW with three ND filters 360, the case where one filter is damaged will be considered. Assuming that the attenuation rate of one ND filter 360 is 2.2%, 0.25 µW×(100%/2.2%)=11.36 µW is obtained.

Further, in Class 1, the output of laser light that can be incident on the human retina is 77 µW at B (wavelength 465 µm), 390 µW at G (wavelength 515 µm), and 390 µW at R (wavelength 640 µm).

That is, when the FOVH is 60°, the laser of B attenuated by the three ND filters 360 is 0.25 µW. If one ND filter 360 having the attenuation rate of 2.2% is damaged, of the laser light attenuated by the remaining two filters, the output of the laser light of B is 11.36 µW. The output of 11.36 µW is well within the limits of the output of the laser light of B in Class 1, which is 77 µW. Therefore, the image relay device 300 can ensure safety compliant with class 1 requirements even if one of the three ND filters 360 is damaged.

FIG. 12 is a diagram illustrating the relationship of FOVH, light transmittance, and the amount of light. In FIG. 12, when the FOVH is 40° and 60°, a combination of light transmittances can ensure safety compliant with class 1 requirements of the output of the laser light attenuated by the remaining two filters, even if one of the three ND filters 360 is damaged, is illustrated. Note that the light transmittance is synonymous with the attenuation rate.

When the FOVH is 40°, if the light transmittances of all of the ND filters 360A, 360B, and 360C are set to 2.2%, the amount of light becomes approximately 0.639 µW. When the FOVH is 60°, if the light transmittances of the ND filters 360A, 360B, and 360C are set to 2.2%, 2.2%, and 4.6%, respectively, the amount of light becomes approximately 1.34 µW.

As described above, according to Embodiment 3, by providing three ND filters 360A, 360B, and 360C in series in the optical path between the lens 110 and the lens 120, the laser light of several tens of mW emitted by the laser emitting unit 60A can be attenuated to approximately several tens of μW. If the laser light is several tens of μW, safety can be ensured even if the laser light is incident on the retina of the user. This is because the laser light is below the upper limit level of Class 1.

Therefore, the image relay device 300 that projects laser light representing the image emitted from the pico projector 50A onto the retina can be provided.

Further, even if one ND filter 360 is damaged, the safety of Class 1 can be ensured by the remaining two ND filters 360. Therefore, the image relay device 300 that ensures safety in the event of damage can be provided.

Figure 13:
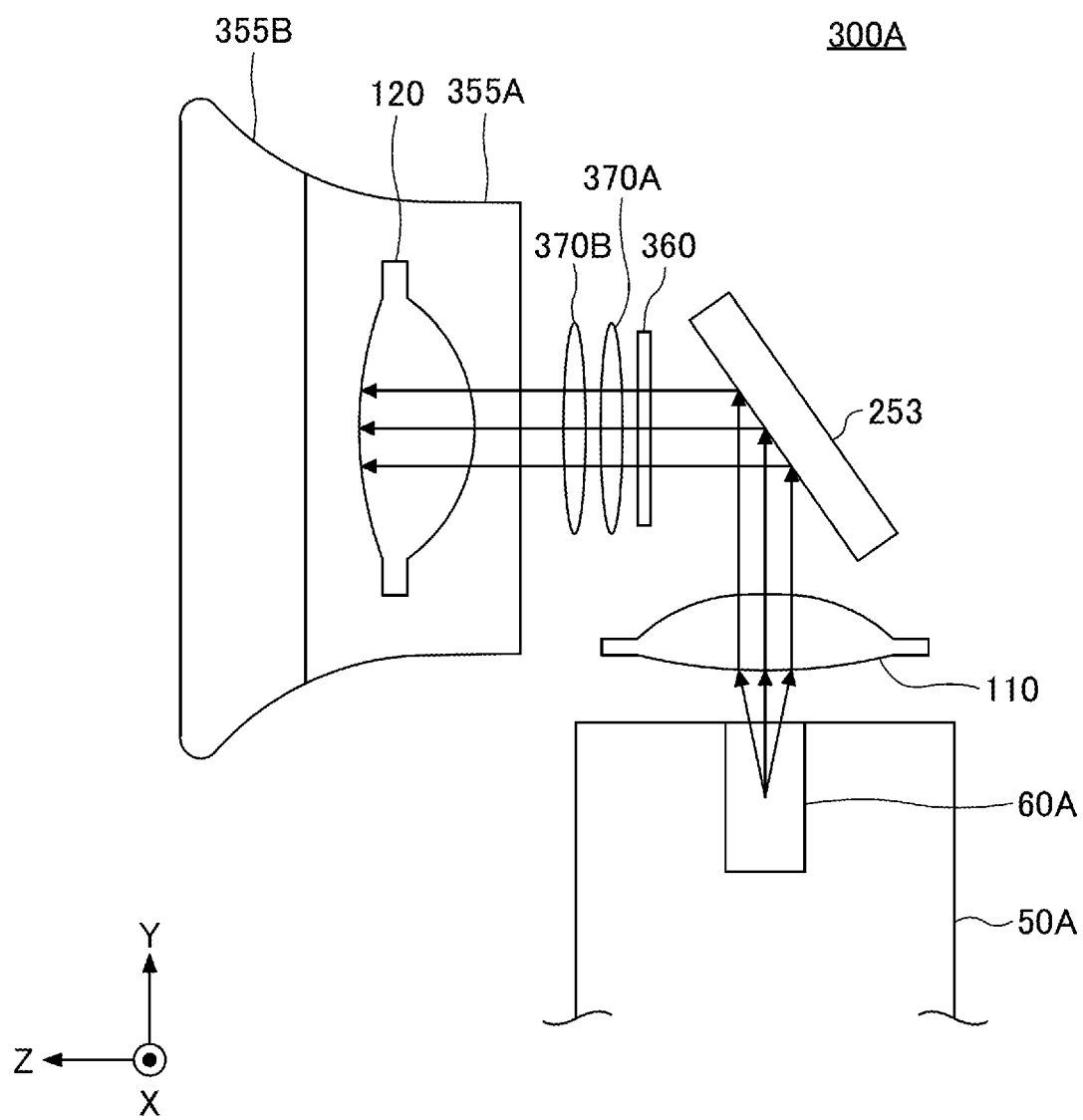
FIG. 13 is a diagram illustrating an image relay device 300A of a first modification of Embodiment 3.

FIG. 13 is a diagram illustrating an image relay device 300A of a first modification of Embodiment 3. FIG. 13 illustrates a cross-sectional structure corresponding to the B-B arrowhead of FIG. 1. The same components as those of the image relay device 100 and 200 of Embodiment 1 and Embodiment 2, and the image relay device 300 of Embodiment 3 are designated by the same reference numerals, and the description thereof will be omitted.

The image relay device 300A includes a lens 110, a lens 120, a mirror 253, an ND filter 360, a polarizing plate 370A and 370B, a lens holder 355A, and a lens cover 355B. The image relay device 300A is attached to a pico projector 50A including a laser emitting unit 60.

The image relay device 300A includes one ND filter 360. The attenuation rate of one ND filter 360 is not at a level that can achieve Class 1.

The two polarizing plates 370A and 370B are examples of a first polarizing plate and a second polarizing plate, respectively. The polarizing plate 370A is rotatable with respect to the polarizing plate 370B. The transmittance of light beams passing through the polarizing plate 370A and the polarizing plate 370B can be changed by rotating the polarizing plate 370A to change the angle of the polarization axis of the polarizing plate 370B with respect to the polarization axis of the polarizing plate 370A.

More specifically, as an example, when a direction of linearly polarized light of the laser light reflected by the mirror 253 and transmitted through the ND filter 360 is the Y direction (the laser light travels in the +Z direction while being polarized in the YZ plane), the fixed polarizing plate 370B has a polarization characteristic that transmits all of the linearly polarized laser light.

Further, the polarizing plate 370A has the same polarization characteristics as the polarizing plate 370B, and is configured to be rotatable around the optical axis of the laser light in the XY plane.

When such polarizing plates 370A and 370B are used, the transmittance of the laser light transmitted through the polarizing plate 370A can be adjusted by adjusting the rotation angle of the polarizing plate 370A with respect to the polarizing plate 370B.

When the polarization axis of the polarizing plate 370A and the polarization axis of the polarizing plate 370B are in the same direction and are set to rotation positions having the same polarization characteristics, the polarizing plates 370A and 370B transmit all the laser light transmitted through the ND filter 360. However, when the polarizing plate 370A is rotated 90° in the XY plane, the relative angle between the two polarization axes becomes 90°, and theoretically, the transmittance of the polarizing plate 370A becomes zero.

Therefore, the transmittance (the attenuation rate) of the light transmitted through the polarizing plate 370B with respect to the laser light incident on the ND filter 360 can be set by adjusting the rotation position of the polarizing plate 370A. For example, the laser light of several tens of mW emitted by the laser emitting unit 60A can be attenuated to approximately several tens of μW. In this way, the output of the B component of the light transmitted through the polarizing plate 370B can be made to satisfy Class 1.

Therefore, the image relay device 300A that projects laser light representing the image emitted from the pico projector 50A onto the retina can be provided.

Figure 14:
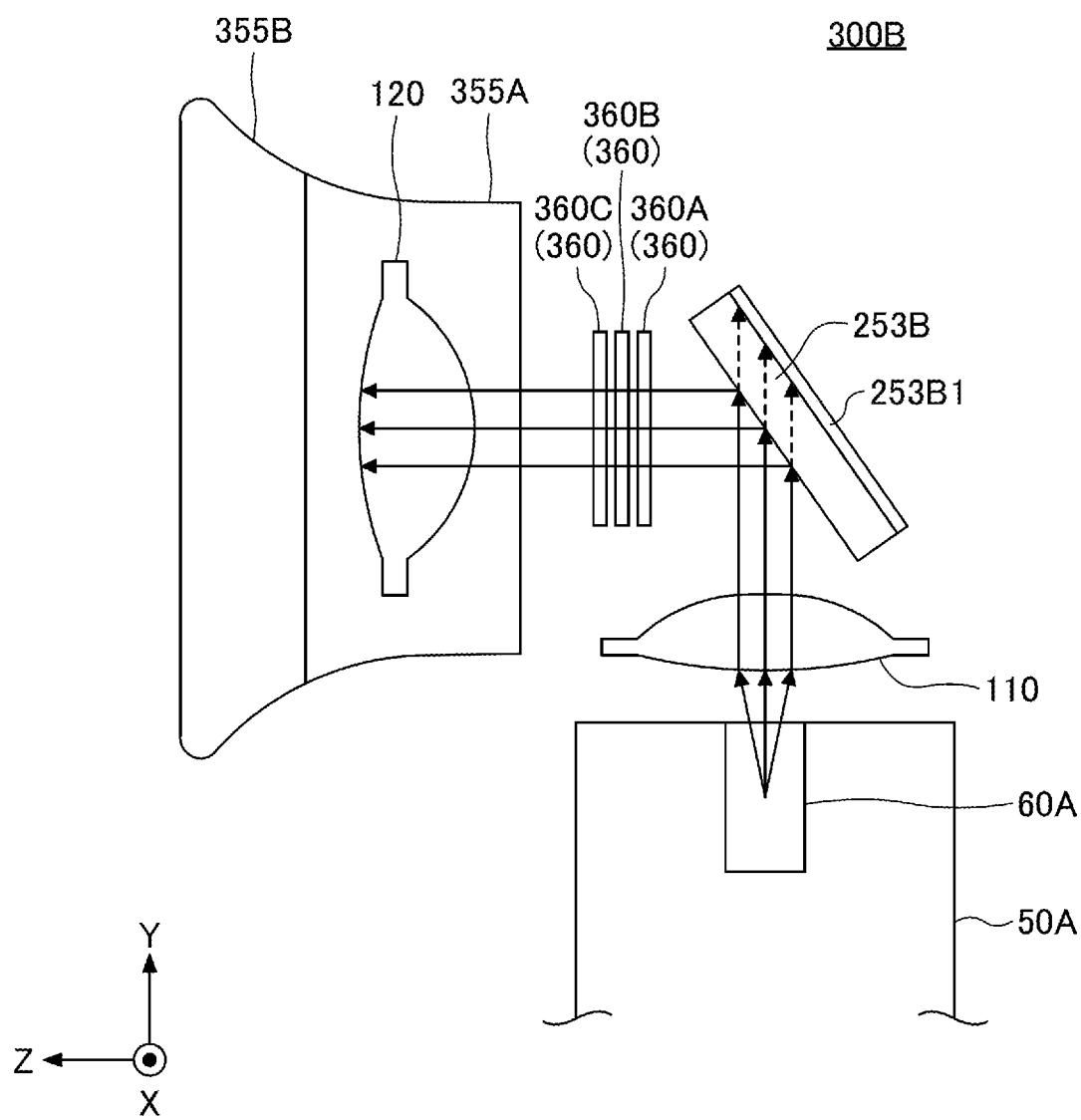
FIG. 14 is a diagram illustrating an image relay device 300B of a second modification of Embodiment 3.

FIG. 14 is a diagram illustrating an image relay device 300B of a second modification of Embodiment 3. FIG. 14 illustrates a cross-sectional structure corresponding to the B-B arrowhead of FIG. 1. The same components as those of the image relay device 100 and 200 of Embodiment 1 and Embodiment 2, and the image relay device 300 of Embodiment 3 are designated by the same reference numerals, and the description thereof will be omitted.

The image relay device 300B includes a lens 110, a lens 120, a mirror 253B, an ND filter 360A, 360B, 360C, a lens holder 355A, and a lens cover 355B. The image relay device 300B includes the mirror 253B having a blast processed layer 253B1 on the back surface side instead of the mirror 253 of the image relay device 300 illustrated in FIG. 11. The back surface of the mirror 253B is a surface opposite to the surface on which the mirror 253B is emitted with the laser light.

Further, the mirror 253B is not a total reflection mirror but a partially reflective mirror. By using the mirror 253B configured by the partially reflective mirror, a reflectance on the front surface is controlled to a low level, and a constant amount of light is transmitted toward the back surface, whereby an attenuating effect can be obtained in the same manner as the ND filter 360.

Generally, the mirror mainly reflects on the front surface side, but a reflection on the back surface side also occurs. The reflection on the back surface side is much weaker than the reflection on the front surface side, but the optical path deviates according to the thickness of the mirror. Therefore, the reflected light on the front surface of the mirror and the reflected light on the back surface of the mirror do not form an image at the same position on the user's retina, and image bleeding or image overlap (ghosting) may occur.

The blast processing layer 253B1 provided on the back surface of the mirror 253B can be produced by performing a blasting process on the back surface of the mirror 253B. For example, such a blast processed layer 253B1 can be implemented by sandblasting or the like.

In the image relay device 300B, the three ND filters 360A, 360B, and 360C are provided in series in the optical path between the lens 110 and the lens 120, and the blast processed layer 25331 is provided on the back surface of the mirror 253B. As a result, the laser light emitted from the laser emitting unit 60A, attenuated and reflected on the surface of the mirror 253B, and transmitted through the ND filters 360A, 360B, and 360C can be attenuated to approximately several tens of μW. If the laser light is several tens of μW, safety can be ensured even if the laser light is incident on the retina of the user. This is because the laser light is below the upper limit level of Class 1.

Further, the laser light indicated by the broken line arrow that reaches the back surface without being reflected by the front surface of the mirror 253B is diffused or absorbed by the blast processed layer 253B1 and therefore does not enter the ND filters 360A, 360B, and 360C.

Therefore, the image relay device 300B that projects laser light representing the image emitted from the pico projector 50A onto the retina and controls image bleeding or overlap (ghosting) can be provided.

Even if one ND filter 360 is damaged, the remaining two ND filters 360 can ensure safety compliant with class 1 requirements. Therefore, the image relay device 300B that ensures safety in the event of damage and also controls image bleeding or overlap (ghosting) can be provided.

Figure 15:
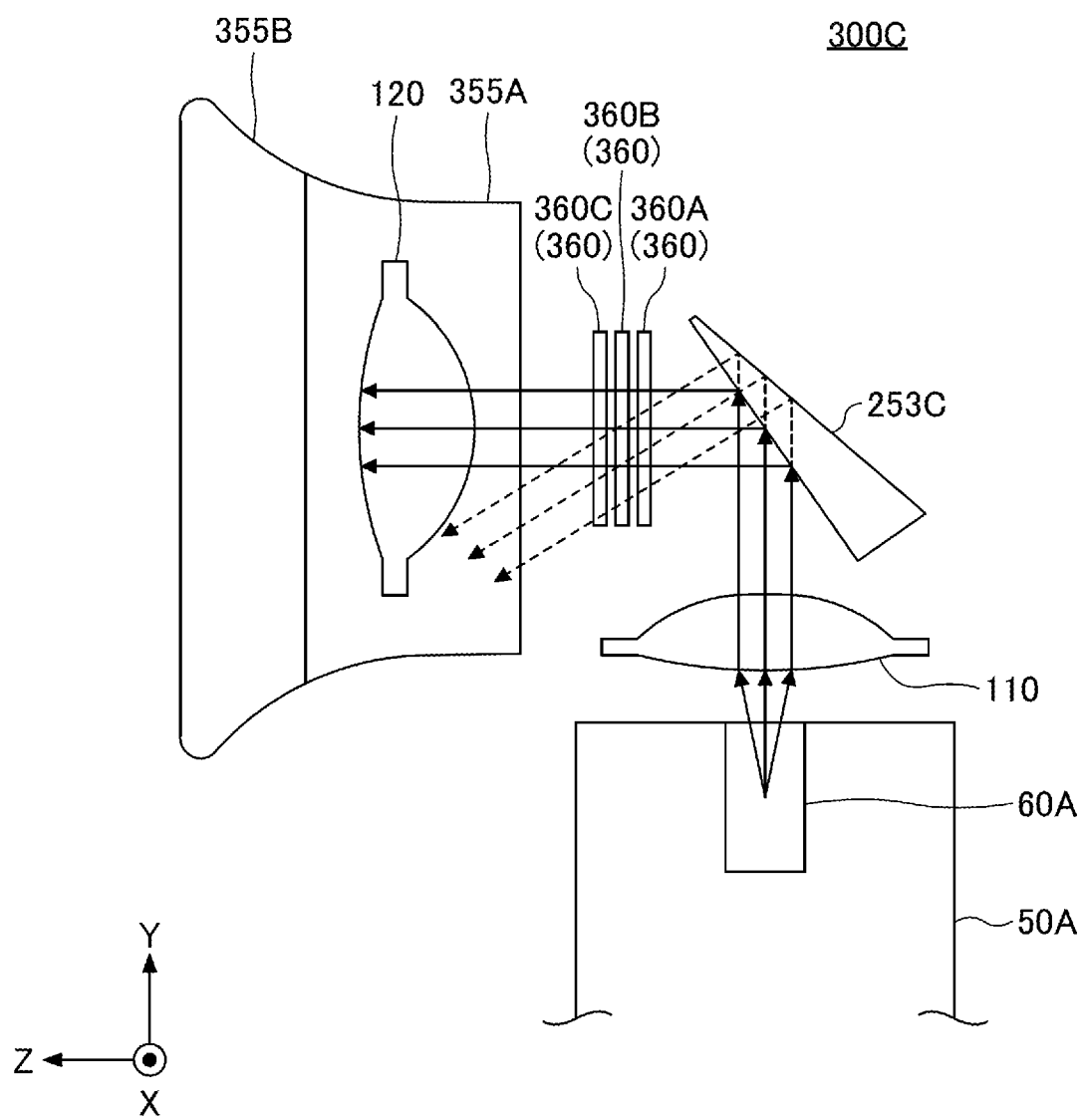
FIG. 15 is a diagram illustrating an image relay device 300C of a third modification of Embodiment 3.

FIG. 15 is a diagram illustrating an image relay device 300C of a third modification of Embodiment 3. FIG. 15 illustrates a cross-sectional structure corresponding to the B-B arrowhead of FIG. 1. The same components as those of the image relay device 100 and 200 of Embodiment 1 and Embodiment 2, and the image relay device 300 of Embodiment 3 are designated by the same reference numerals, and the description thereof will be omitted.

The image relay device 300C includes a lens 110, a lens 120, a mirror 253C, an ND filter 360A, 360B, 360C, a lens holder 355A, and a lens cover 355B. The image relay device 300C includes the mirror 253C instead of the mirror 253B of the image relay device 300B illustrated in FIG. 14. The mirror 253C is a mirror in which the front surface and the back surface are not parallel, and the back surface is inclined with respect to the front surface. In other words, the mirror 253C is a mirror having a trapezoidal side shape.

As described in the second modification of Embodiment 3, in general, the mirror mainly reflects on the front surface, but the reflection on the back surface side also occurs. The reflection on the back surface side is much weaker than the reflection on the front surface side, but the optical path deviates according to the thickness of the mirror. Therefore, the reflected light on the front surface of the mirror and the reflected light on the back surface of the mirror do not form an image on the user's retina, and image bleeding or image overlap (ghosting) may occur.

Because the back surface of the mirror 253C is inclined with respect to the front surface, the laser light reaches the back surface of the mirror 253C as indicated by the broken line arrow without being reflected at the front surface of the mirror 253C. The laser light is reflected at a different angle from the laser light reflected on the front surface of the mirror 253C as indicated by the solid arrow. Therefore, the laser light can be prevented from entering the user's pupil, or the laser light can be prevented from reaching the retina even if the laser light enters the user's pupil.

In the image relay device 300C, the laser light emitted from the laser emitting unit 60A, attenuated and reflected on the surface of the mirror 253B, and transmitted through the ND filters 360A, 360B, and 360C can be attenuated to approximately several tens of μW. If the laser light is several tens of μW, safety can be ensured even if the laser light is incident on the retina of the user. This is because the laser light is below the upper limit level of Class 1.

Further, the laser light that reaches the back surface of the mirror 253C without being reflected at the front surface of the mirror 253C is reflected at a different angle from the laser light reflected on the front surface of the mirror 253C. Therefore, the laser light does not enter the user's pupil, or does not reach the retina even if the laser light enters the user's pupil.

Therefore, the image relay device 300C that projects the laser light representing the image emitted from the pico projector 50A onto the retina and also controls image bleeding and overlap (ghosting) can be provided.

Even if one ND filter 360 is damaged, the remaining two ND filters 360 can ensure safety compliant with class 1 requirements. Therefore, the image relay device 300C that ensures safety in the event of damage and also controls image bleeding or overlap (ghosting) can be provided.

Figure 16:
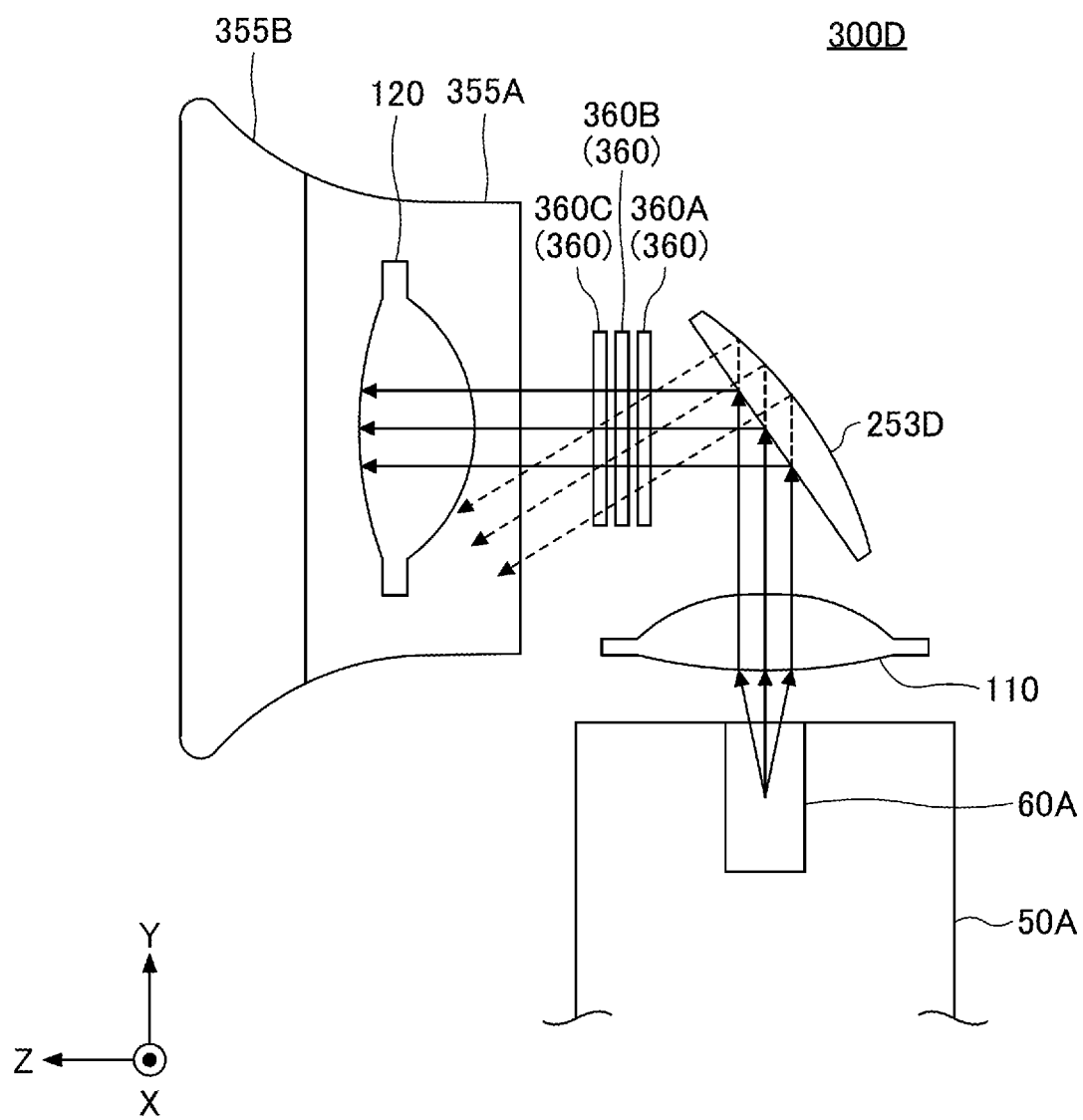
FIG. 16 is a diagram illustrating an image relay device 300C of a fourth modification of Embodiment 3.

Further, instead of the image relay device 300C illustrated in FIG. 15, the image relay device 300D illustrated in FIG. 16 may be configured. FIG. 16 is a diagram illustrating an image relay device 300C of a fourth modification of Embodiment 3. The image relay device 300D includes a mirror 253D having a convexly curved back surface instead of the mirror 253C of the image relay device 300C illustrated in FIG. 15.

If the mirror 253D having the curved back surface is used, the laser light that reaches the back surface of the mirror 253D without being reflected at the front surface of the mirror 253D is reflected at a different angle from the laser light reflected on the front surface of the mirror 253D. Therefore, the laser light can be prevented from entering the user's pupil, or the laser light can be prevented from reaching the retina even if the laser light enters the user's pupil. The back surface of the mirror 253D may be curved in a concave shape.

Embodiment 4

Figure 17:
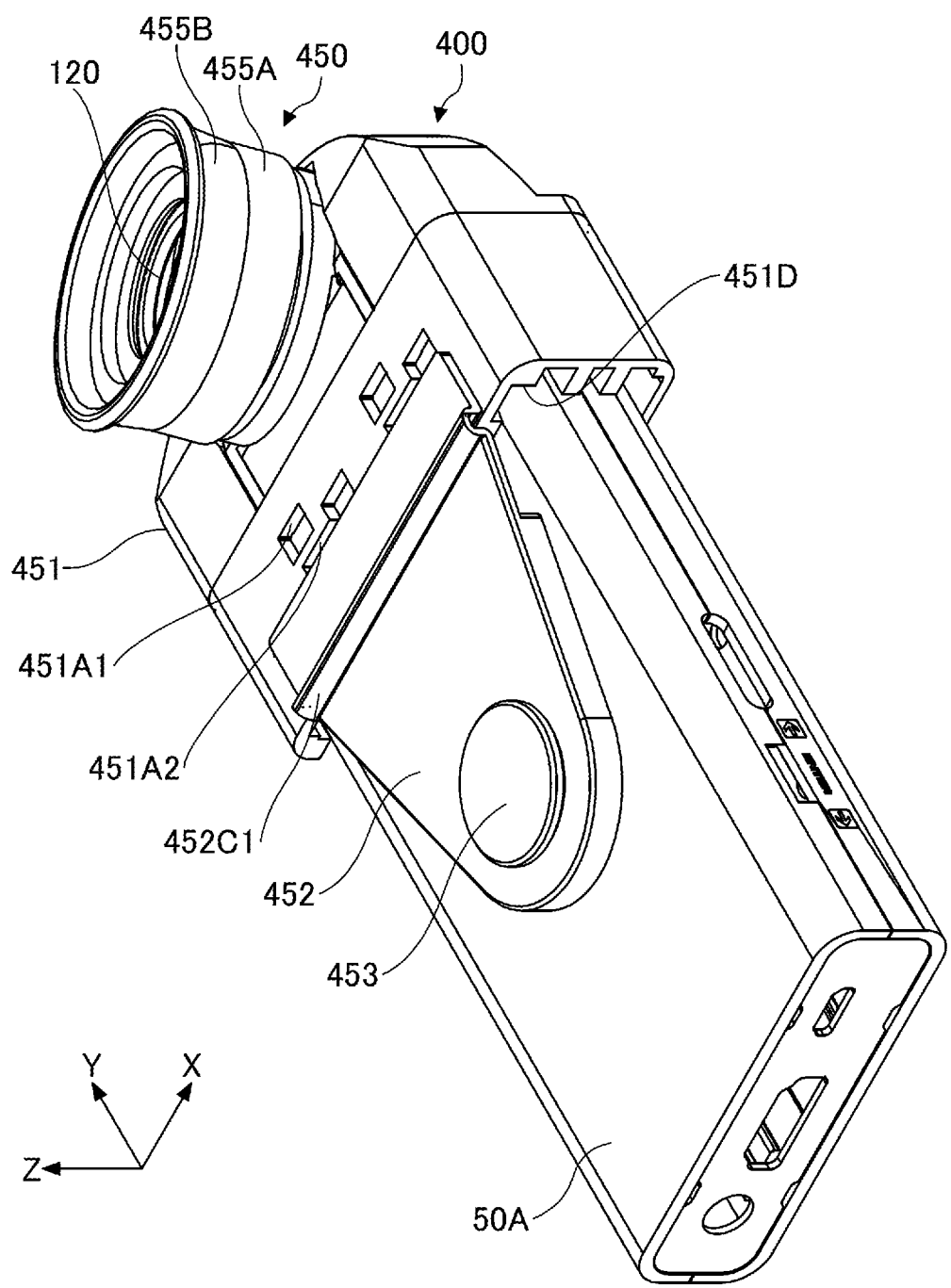
FIG. 17 is a diagram illustrating an image relay device 400 according to Embodiment 4.
Figure 18:
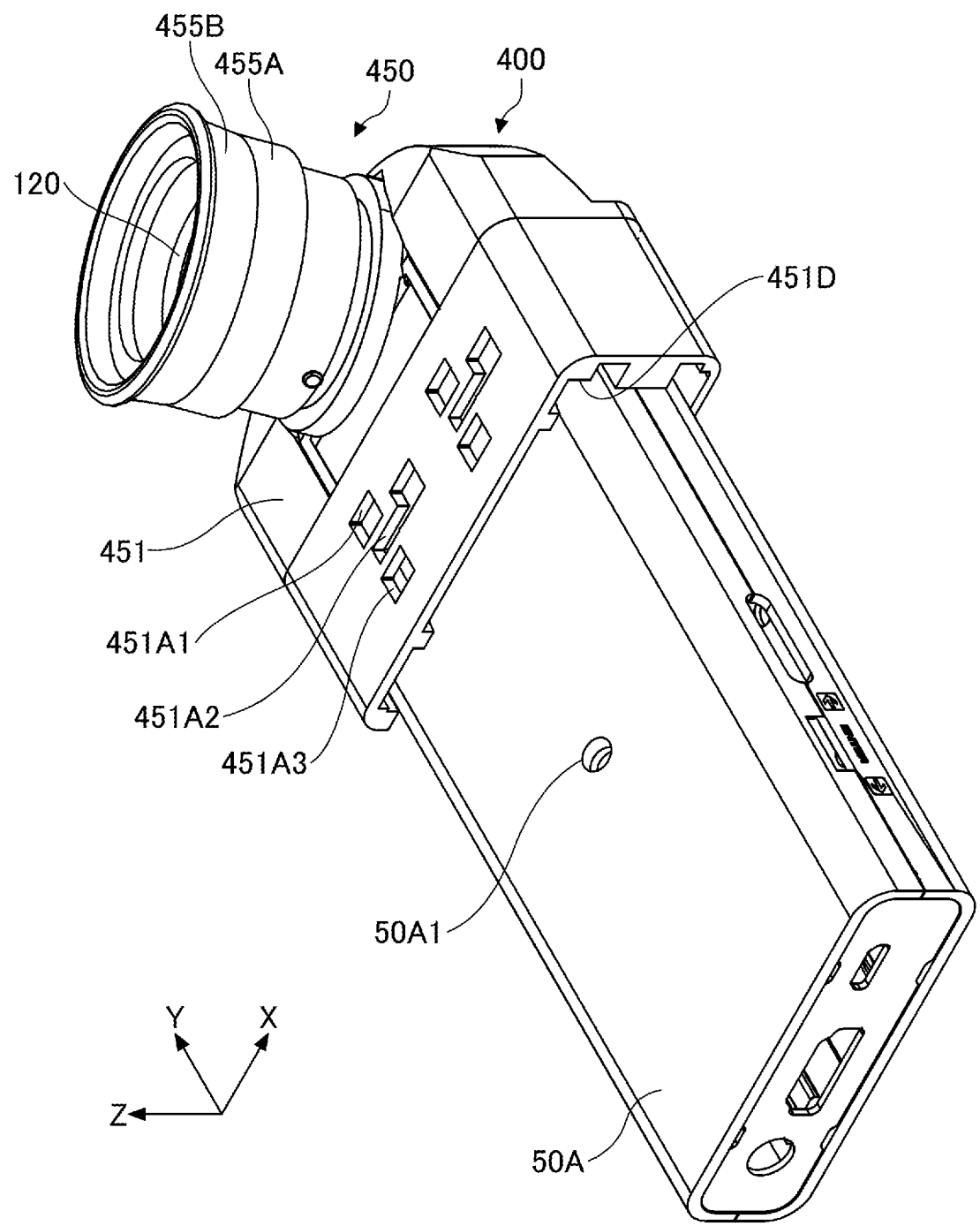
FIG. 18 is a diagram illustrating a state in which a mounting portion 452 and a screw 453 are removed from the image relay device 400.

FIG. 17 is a diagram illustrating an image relay device 400 according to Embodiment 4. The image relay device 400 is attached to a pico projector 50A. FIG. 18 illustrates the appearance of the image relay device 400.

The image relay device 400 includes a holder 450. The image relay device 400 includes a lens 110, a lens 120, a mirror 253, an ND filter 360A, 360B, and 360C, similarly to the image relay device 300 of Embodiment 3. The lens 120 is exposed from a central opening of a lens cover 455 of the holder 450, and the lens 110, the lens 120, the mirror 253, the ND filter 360A, 360B, and 360C are built in the holder 450.

Figure 19:
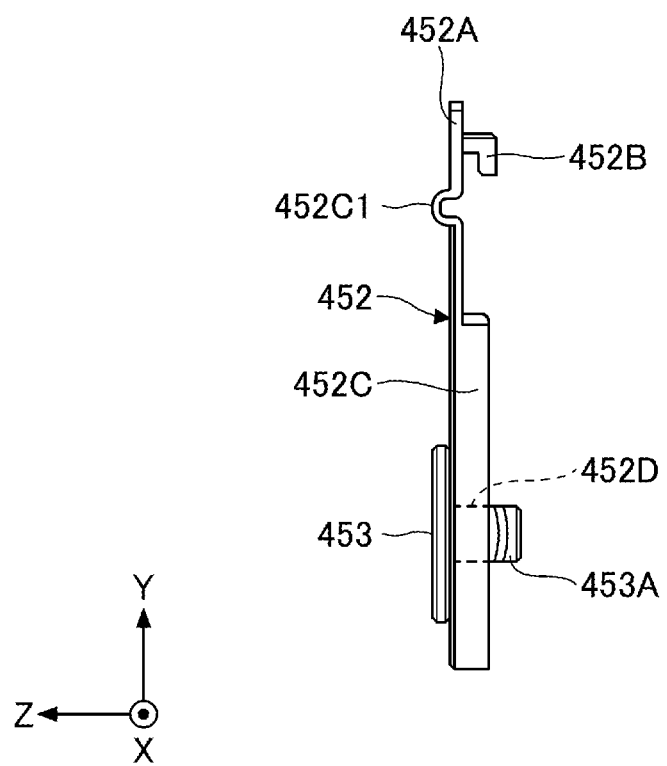
FIG. 19 is a diagram illustrating the mounting portion 452 and the screw 453.

The holder 450 includes a base portion 451, a mounting portion 452, a screw 453, a lens holder 455A, and a lens cover 455B. Here, in addition to FIG. 17, FIG. 18, and FIG. 19 will be used for the description. FIG. 18 is a diagram illustrating a state in which the mounting portion 452 and the screw 453 are removed from the image relay device 400. FIG. 19 is a diagram illustrating the mounting portion 452 and the screw 453.

The base portion 451 is a housing having a configuration in which an end portion of the pico projector 50A on the +Y direction side is fitted inside. The size of the internal space connected to an opening 451D of the base portion 451 corresponds to the size of the pico projector 50A.

The base portion 451 includes one or more pairs of engaging holes 451A1, 451A2, and 451A3 on the −Y direction side of the surface of the +Z direction side. The pairs of engaging holes 451A1, 451A2, and 451A3 are provided along the X direction, respectively. Further, the pairs of engaging holes 451A1, 451A2, and 451A3 are arranged in this order from the +Y direction side to the −Y direction side.

The pairs of engaging holes 451A1, 451A2, and 451A3 penetrate a wall portion of the base portion 451 on the +Z direction side. For example, the engaging holes 451A1 and the engaging holes 451A3 are rectangular holes having a longitudinal direction in the X direction in a plan view, and the engaging holes 451A2 are L-shaped holes. The position of the end portion of the L-shaped hole of the engaging hole 451A2 on the −X direction side is aligned with the position of the engaging hole 451A1 and the engaging hole 451A3 in the X direction.

The mounting portion 452 includes a base portion 452A, a pair of engaging portions 452B, a fixing portion 452C, and a through hole 452D. The base portion 452A is a rectangular plate-shaped portion in a plan view, and the pair of engaging portions 452B are provided on the back surface side (the pico projector 50A side).

FIG. 19 illustrates one of the pair of engaging portions 452B. The pair of engaging portions 452B are arranged at intervals in the X direction. The distance between the pair of engaging portions 452B in the X direction is equal to the distance between the pair of engaging holes 451A1 and 451A3 in the X direction. Further, the length of each engaging portion 452B in the X direction corresponds to the length of the engaging holes 451A1 and 451A3 in the X direction.

The engaging portion 452B protrudes in the −Z direction from the back surface of the base portion 452A and is bent in the −Y direction. The engaging portion 452B can be inserted into the engaging holes 451A1, 451A2, or 451A3. If the pair of engaging portions 452B are inserted into the pairs of engaging holes 451A1 or 451A3 and slid in the −Y direction, the pair of engaging portions 452B can be engaged with the pairs of engaging holes 451A1 or 451A3. Further, if the pair of engaging portions 452B are inserted into the pair of engaging holes 451A2 and slid in the −Y direction to engage and then slid in the −X direction, the pair of engaging portions 452B can be engaged with the pair of engaging holes 451A2 at the same position in the X direction as when engaged with the engaging holes 451A1 or 451A3.

The fixing portion 452C is a continuous portion of the base portion 452A in the −Y direction. Because the fixing portion 452C is connected to the base portion 452A via an arch-shaped bent portion 452C1, the fixing portion 452C can be bent in the ±Z direction with respect to the base portion 452A. The fixing portion 452C has an approximately triangular shape in a plan view, and the portion on an apex side of the −Y direction side is bent along the X direction. Because the fixing portion 452C contacts the surface of the pico projector 50A of the +Z direction side, the portion on the −Y direction side of the bent portion 452C1 protrudes in the −Z direction and becomes thicker.

The through hole 452D is provided at approximately the center of the width of the X direction on the −Y direction side of the fixing portion 452C. The screw 453 is inserted into the through hole 452D.

The screw 453 is, for example, screwed into a screw hole 50A1 provided on the surface of the pico projector 50A of the +Z direction side, with a screw tip 453A inserted into the through hole 452D of the fixing portion 452C. The diameter of the screw hole 50A1 provided on the surface of the pico projector 50A of the +Z direction side is often ¼ inch screw (6.35 mm screw) for fixing and installing on a tripod. Therefore, using the ¼ inch screw as the screw tip 453A increases versatility and enables to cope with the case where different pico projectors are used.

The mounting portion 452 is fixed to the pico projector 50A by screwing the screw tip 453A of the screw 453 into the screw hole 50A1 of the pico projector 50A in a state where the pair of engaging portions 452B are engaged with any of the pairs of engaging holes 451A1, 451A2, and 451A3. In this way, the holder 450 can be attached to the pico projector 50A.

The pairs of engaging holes 451A1, 451A2, and 451A3 to engage the pair of engaging portions 452B may be selected according to the size of the pico projector 50A in the Y direction or the distance from the +Y direction end of the pico projector 50A to the screw hole 50A1. The positions of the pairs of engaging holes 451A1, 451A2, and 451A3 are different in the Y direction, and provided in three ways so as to correspond to various types of pico projectors 50A.

The lens holder 455A is the same as the lens holder 355A of Embodiment 3, and holds the lens 120. The lens holder 455A is attached to the +Z direction side of the end portion of the +Y direction side of the base portion 451. The lens cover 455B, similar to the lens cover 355B of Embodiment 3, is attached to the lens holder 455A.

Figure 20:
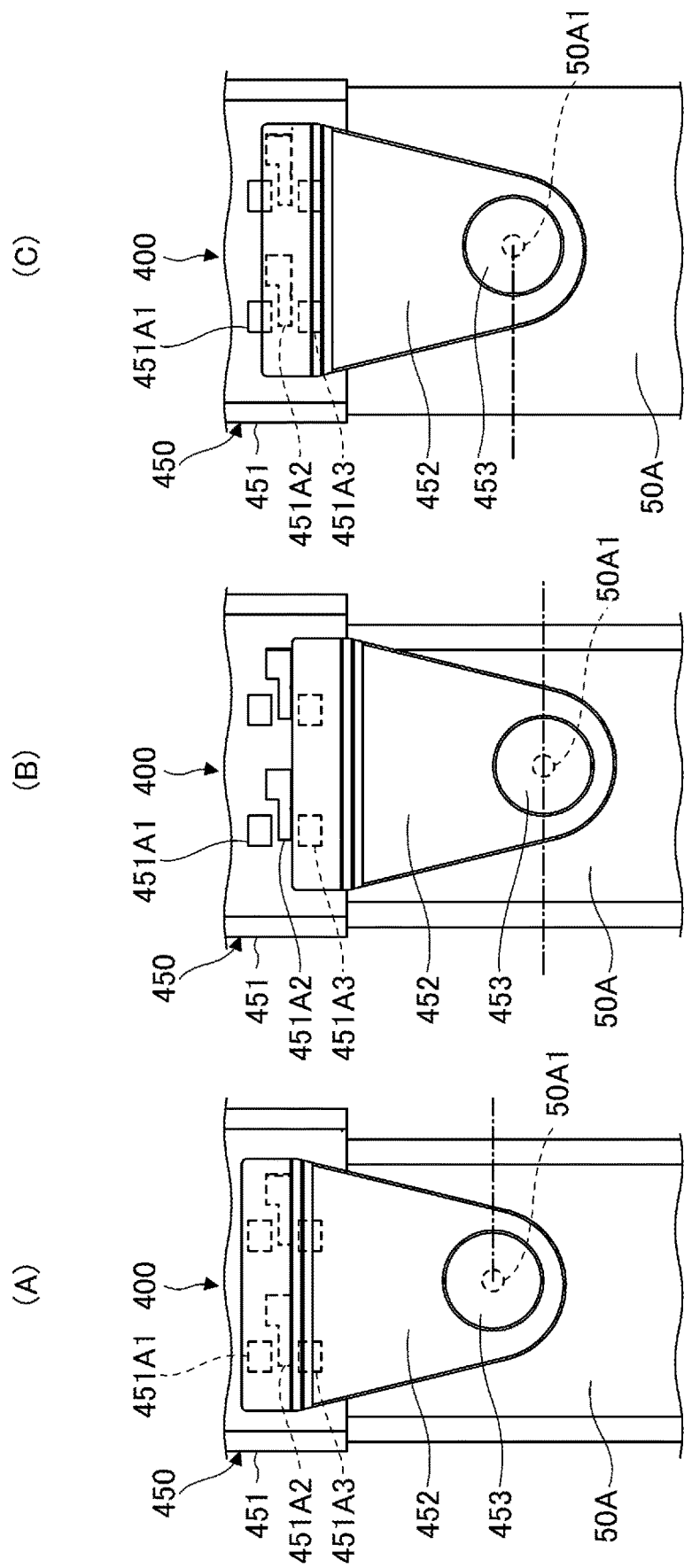
FIG. 20 is a diagram illustrating a state in which the image relay device 400 is attached to a pico projector 50A of various sizes.

FIG. 20 is a diagram illustrating a state in which the image relay device 400 is attached to the pico projector 50A of various sizes. FIG. 20A, FIG. 20B, and FIG. 20C illustrate three pico projectors 50A in which the positions of the screw holes 50A1 are different. In FIG. 20A to FIG. 20C, the engaging portion 452B of the mounting portion 452 is omitted, and the engaging holes 451A1, 451A2, and 451A3 are illustrated.

In FIG. 20A, the engaging portion 452B is fixed to the engaging hole 451A1. In FIG. 20B, the engaging portion 452B is fixed to the engaging hole 451A3. In FIG. 20C, the engaging portion 452B is fixed to the engaging hole 451A2.

The holder 450 of the image relay device 400 can be attached to the pico projectors 50A of various sizes in which the positions of the screw holes 50A1 are different, depending on which of the engaging holes 451A1, 451A2, or 451A3 is attached to the mounting portion 452.

Although the configuration in which the image relay device 400 includes the holder 450 including three types of engaging holes 451A1, 451A2, and 451A3 having different positions in the Y direction is described here, the number of engaging holes may be any number.

Figure 21:
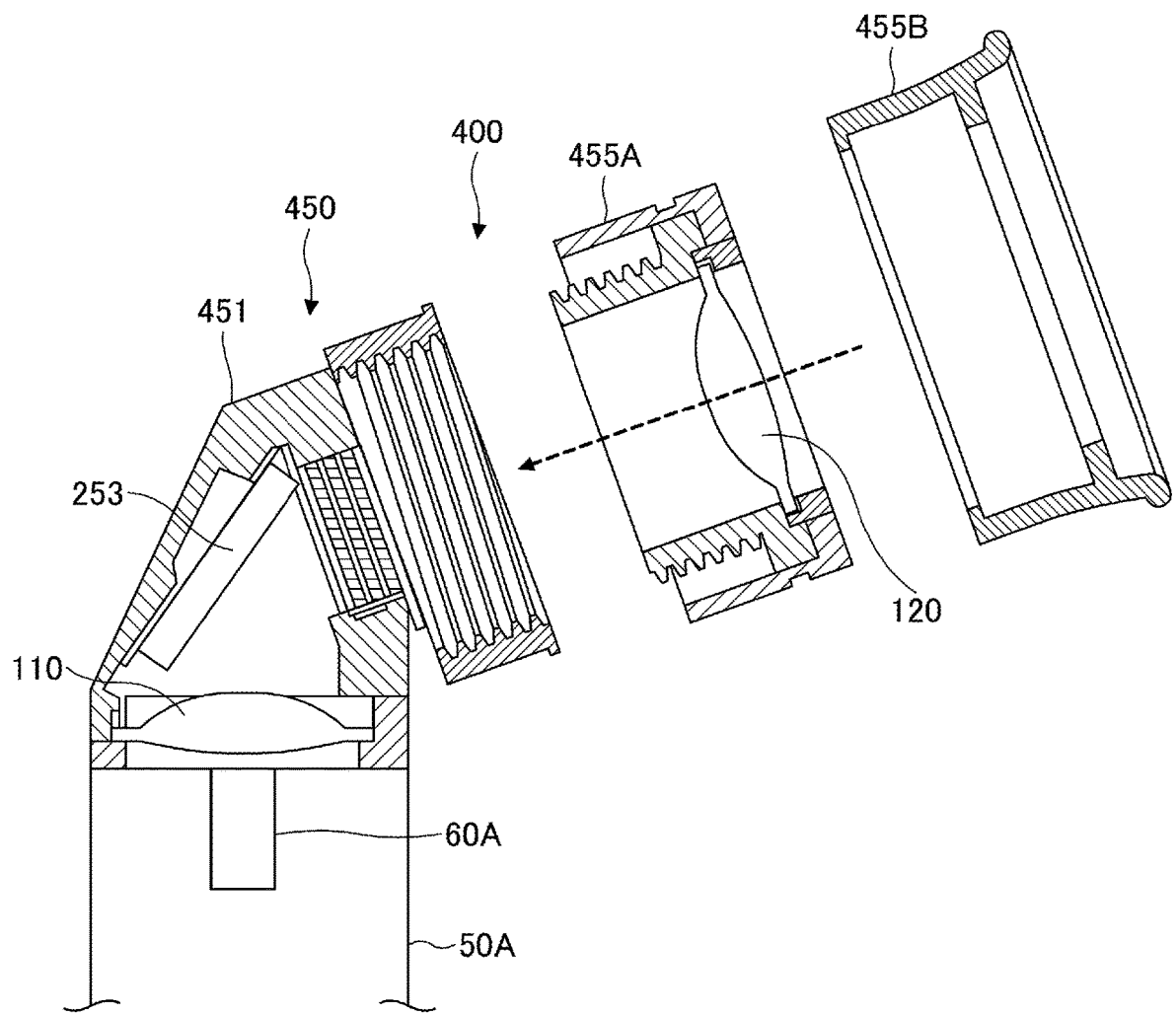
FIG. 21 is a diagram illustrating an image relay device 400A of a first modification of Embodiment 4.
Figure 22:
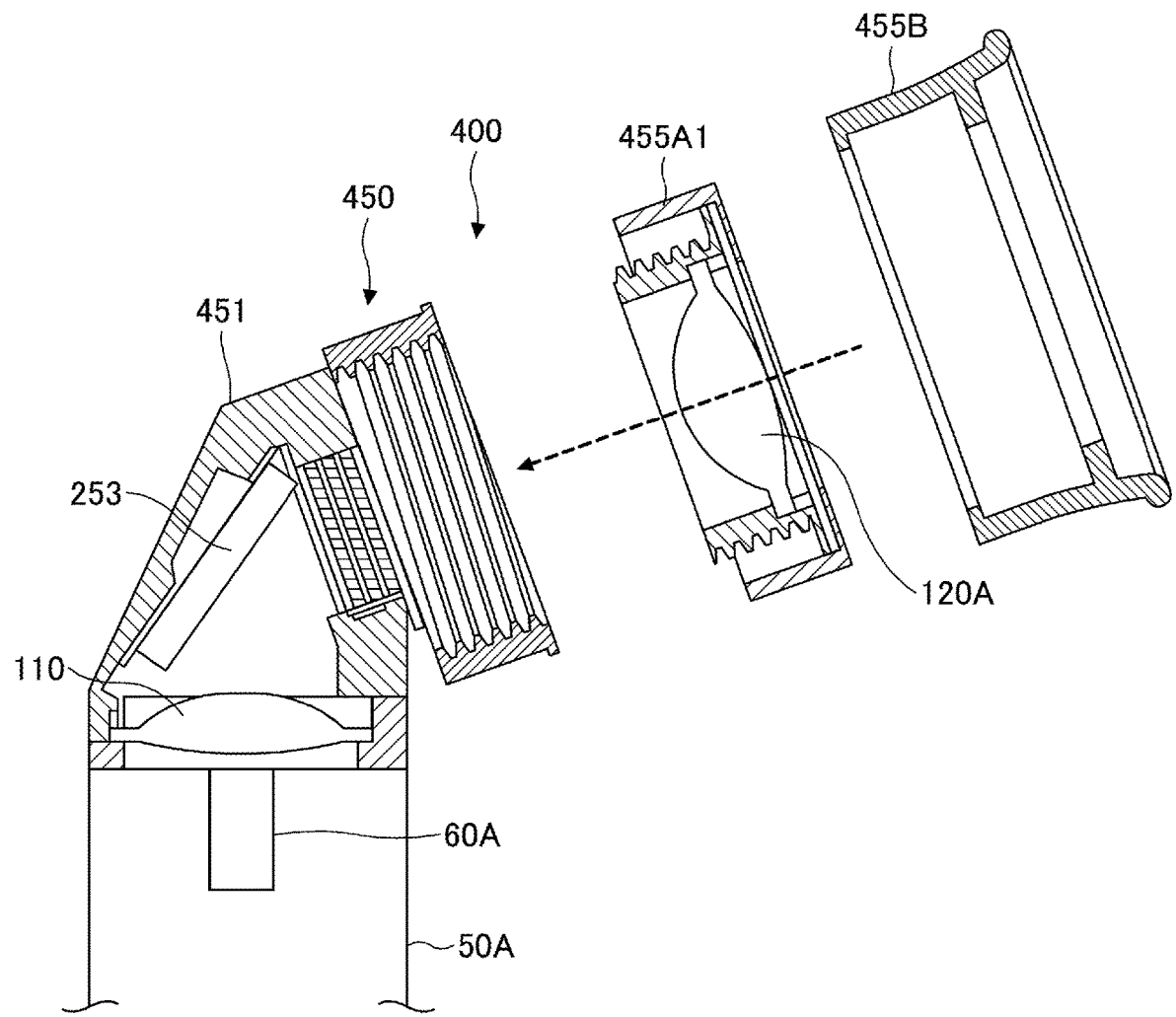
FIG. 22 is a diagram illustrating the image relay device 400A of the first modification of Embodiment 4.

FIG. 21 and FIG. 22 are diagrams illustrating an image relay device 400A of a first modification of Embodiment 4. The image relay device 400A includes a holder 450. The holder 450 includes a base portion 451, a lens holder 455A, and a lens cover 455B. Here, a mounting portion 452 and a screw 453 of the holder 450 are omitted.

The lens holder 455A holding the lens 120 illustrated in FIG. 21 is screwed to the base portion 451 and can be replaced with the lens holder 455A1 holding the lens 120A illustrated in FIG. 22.

The lens 120 is, for example, a lens having a FOVH of 40°, and the lens 120A is, for example, a lens having a FOVH of 60°. The lens 120A is thicker than the lens 120 and has a shorter focal length. Therefore, the lens holder 455A1 is shorter than the lens holder 455A.

Figure 23:
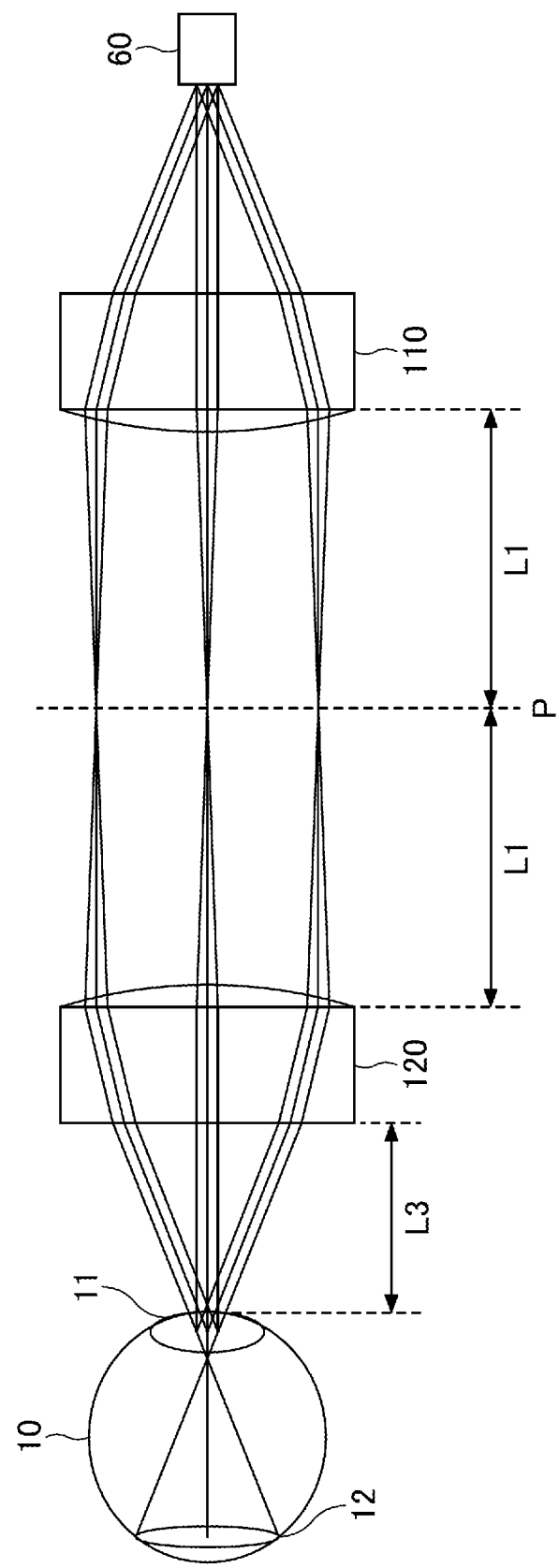
FIG. 23 is a diagram illustrating an optical path when lenses 120 and 120A are used.
Figure 24:
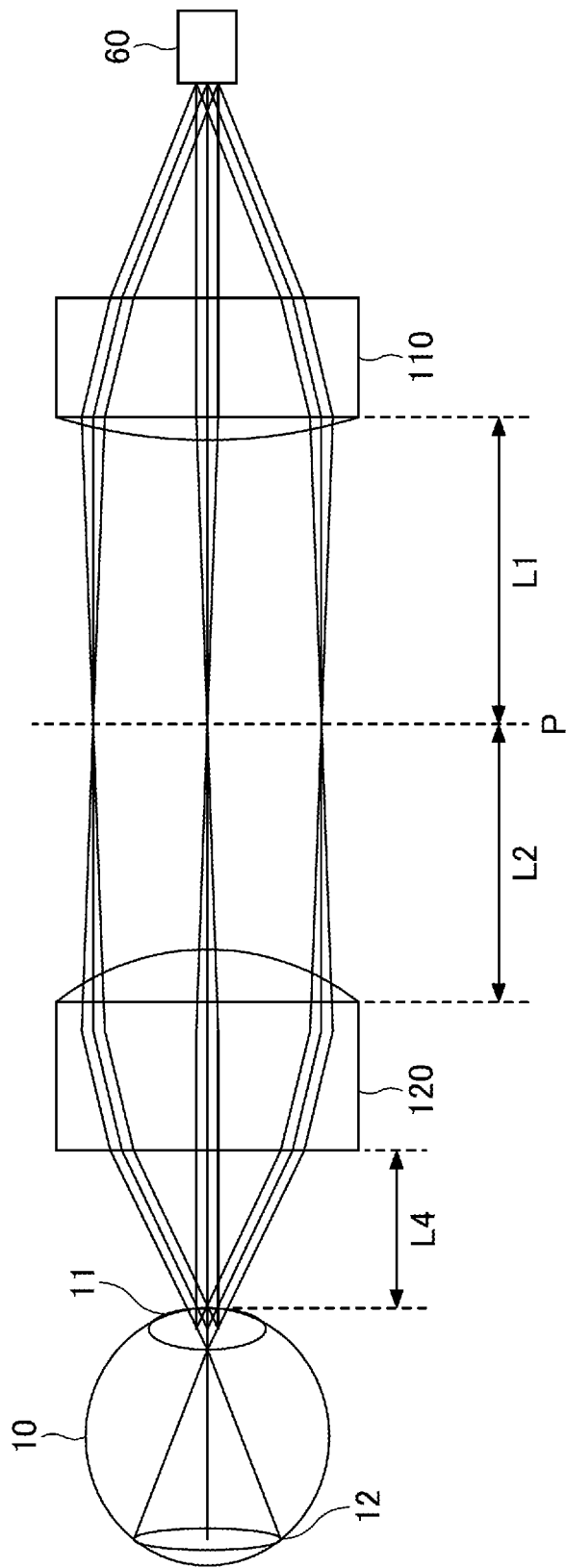
FIG. 24 is a diagram illustrating the optical path when the lenses 120 and 120A are used.

FIG. 23 and FIG. 24 are diagrams illustrating an optical path when the lenses 120 and 120A are used. The lens 110 is, for example, a lens having a FOVH of 40°.

As illustrated in FIG. 23, when the lens 120 is used, the distances from the lenses 110 and 120 to point P where the laser light converges between the lens 110 and the lens 120 are both equal to L1. Working Distance (WD) of the lens 120 is L3.

As illustrated in FIG. 24, when the lens 120A is used, the distances from the lenses 110 and 120A to point P where the laser light converges between the lens 110 and the lens 120A are L1 and L2 (L1>L2), respectively. This is because the lens 120A has a larger FOVH. The WD of the lens 120A is L4 (L4<L3).

Because the FOVH of the lens 120A is 60°, which is larger than the FOVH of the lens 120A (40°), wider laser light is incident on the user's retina 12 to provide a larger image.

FIG. 25 to FIG. 28 are diagrams illustrating an image relay device 400B of a second modification of Embodiment 4. The difference between the image relay device 400B and the image relay device 400 of Embodiment 4 is that the image relay device 400B includes a holder 450B.

The holder 450B includes a base portion 451B, a mounting portion 452, a lens holder 455A, and a lens cover 455B. The holder 450B also includes a screw 453 (see FIG. 17), which is not illustrated here.

The base portion 451B (an example of a rotating mechanism) differs from the base portion 451 of the holder 450 of Embodiment 4 in that the lens holder 455A is rotatably held in a range of 90° in the XZ plane. Note that the base portion 451 is omitted in FIG. 26 and FIG. 28.

Figure 25:
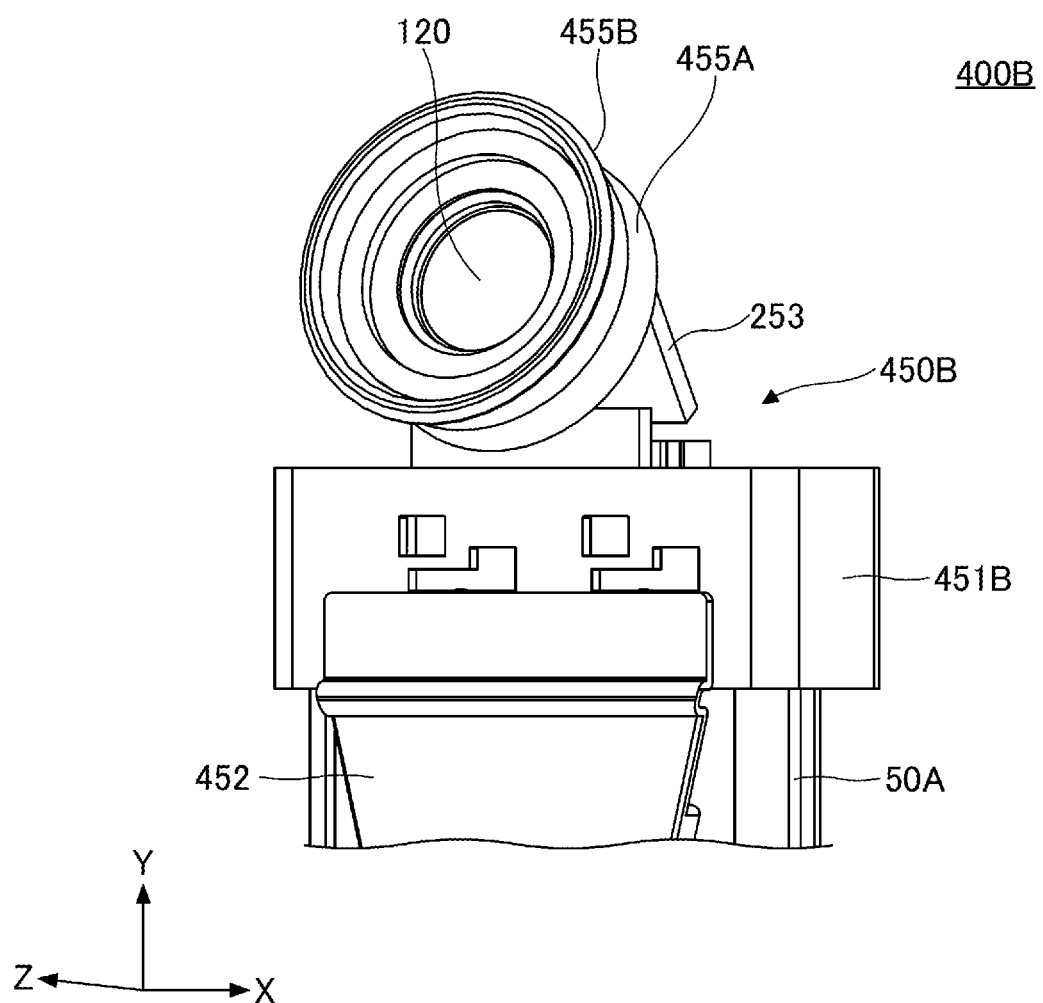
FIG. 25 is a diagram illustrating an image relay device 400B of a second modification of Embodiment 4.
Figure 26:
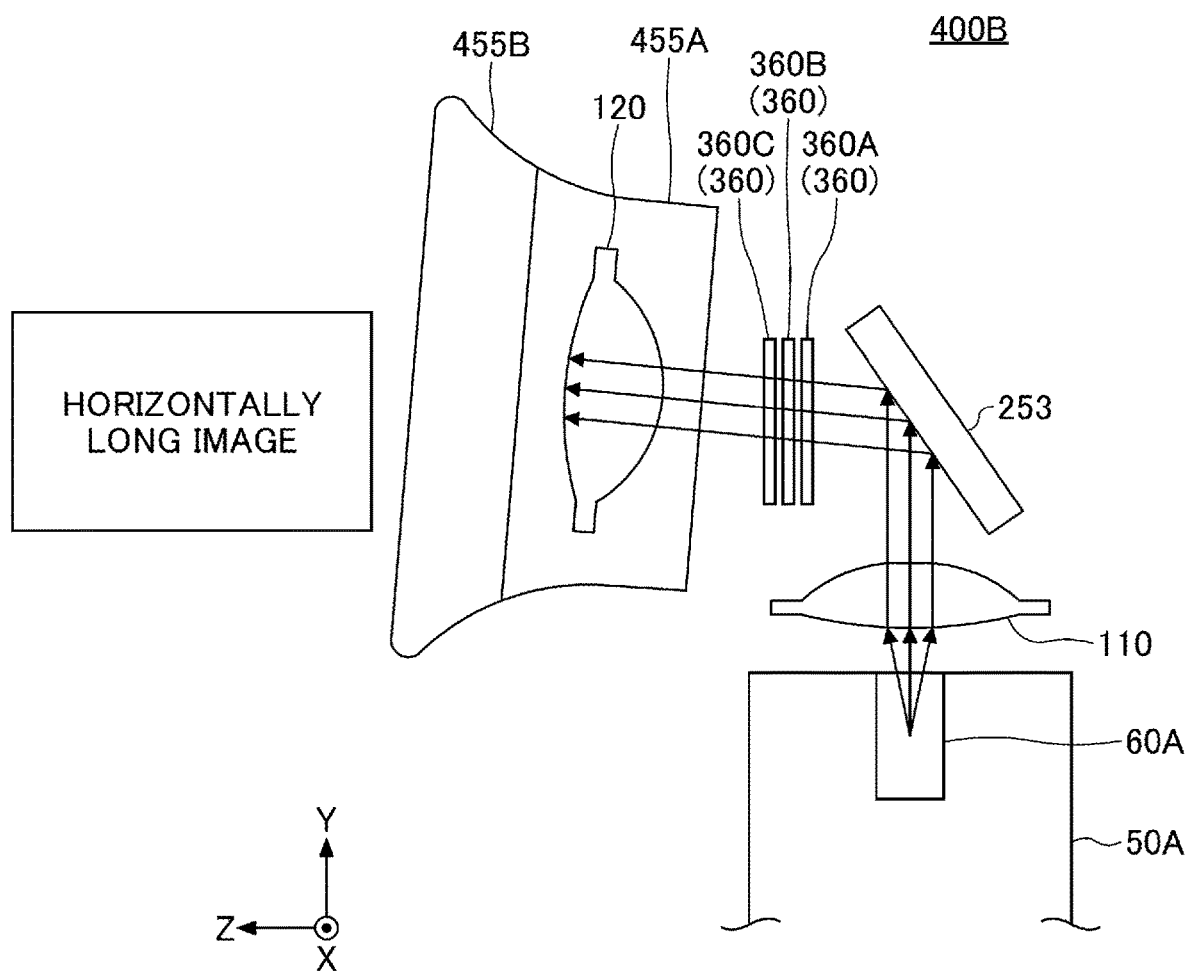
FIG. 26 is a diagram illustrating the image relay device 400B of the second modification of Embodiment 4.

In FIG. 25 and FIG. 26, the lens holder 455A and the lens cover 455B are oriented so that the lens 120 faces the +Z direction side. In this case, the user visually recognizes a wider-than-tall image output from the laser emitting unit 60A as a wider-than-tall image.

Figure 28:
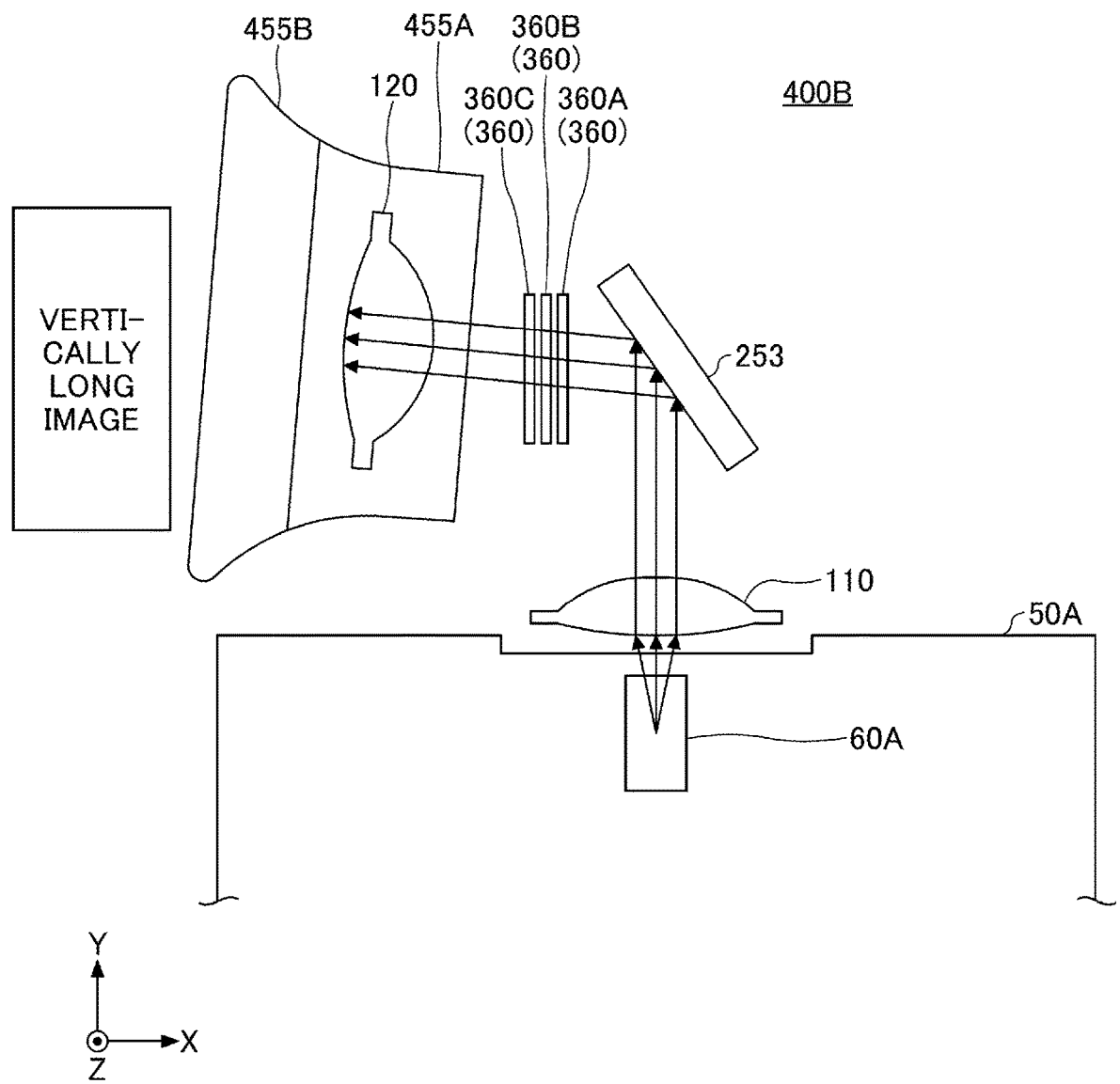
FIG. 28 is a diagram illustrating the image relay device 400B of the second modification of Embodiment 4.

Further, in FIG. 27 and FIG. 28, the lens holder 455A and the lens cover 455B are rotated so that the lens 120 faces the −X direction side. In this case, the user visually recognizes the wider-than-tall image output from the laser emitting unit 60A as a taller-than-wide image.

This will be explained. If the image output from the laser emitting unit 60A is a wider-than-tall image, when the holder 450B is installed in the directions of FIG. 25 and FIG. 26, the projected image reflected by the mirror 253 is a wider-than-tall image.

Here, when the holder 450B is rotated by 90° as illustrated in FIG. 27 and FIG. 28, the image output from the laser emitting unit 60A is still a wider-than-tall image, but the image projected on the mirror 253 becomes a taller-than-wide image. When the wider-than-tall image is reflected by the mirror, the longer direction is visually recognized in the horizontal direction and the shorter direction is visually recognized in the vertical direction. However, when the mirror 253 is rotated 90° to the right, the wider-than-tall image is visually recognized as a vertical image in which the shorter direction at the right side of the wider-than-tall image becomes the bottom. In other words, the wider-than-tall image looks taller-than-wide when viewed from the side using a mirror.

As described above, according to the second modification of the embodiment, the image relay device 400B capable of corresponding to the wider-than-tall image and the taller-than-wide image output from the laser emitting unit 60A can be provided.

Embodiment 5

Figure 29:
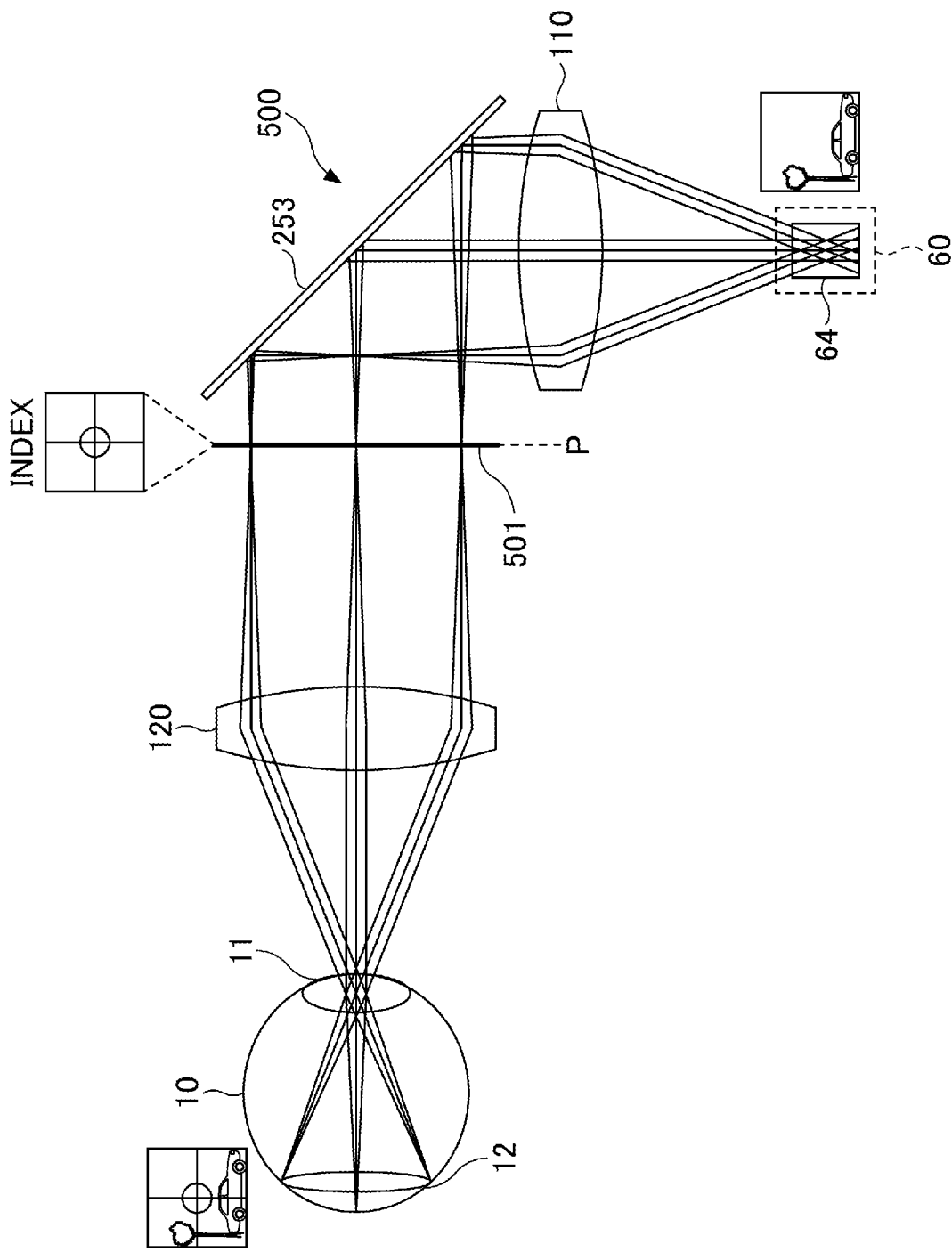
FIG. 29 is a diagram illustrating an image relay device 500 according to Embodiment 5.

FIG. 29 is a diagram illustrating an image relay device 500 according to Embodiment 5. The image relay device 500 has the same configuration as the image relay device 300 of Embodiment 3. FIG. 29 illustrates a lens 110, a lens 120, and a mirror 253 among the components of the image relay device 500. The laser light emitted from a scan unit 64 of a laser emitting unit 60 is incident on the lens 110.

An index 501 (an example of a transparent member) is arranged at position P where the laser light converges between the lens 110 and the lens 120. The index 501 is, for example, an index for a visual acuity test, and a circle is drawn on a transparent film at the intersection of two straight lines, intersecting each other, extending in the horizontal direction and the vertical direction. As an example, the index can be used as a fixation index for a visual field test.

If the index is placed at point P, an image of the index is formed on the retina 12. Therefore, when the scan unit 64 scans the laser light and draws an image of an automobile or the like, an image in which the fixation index for visual field test is superimposed on the image of the automobile or the like is formed on the retina 12.

Therefore, according to Embodiment 5, the image relay device 500 capable of forming the image of the image used as the fixation index of the visual field test on the retina 12 can be provided.

A transparent film including various images may be arranged instead of the index 501.

Figure 30:
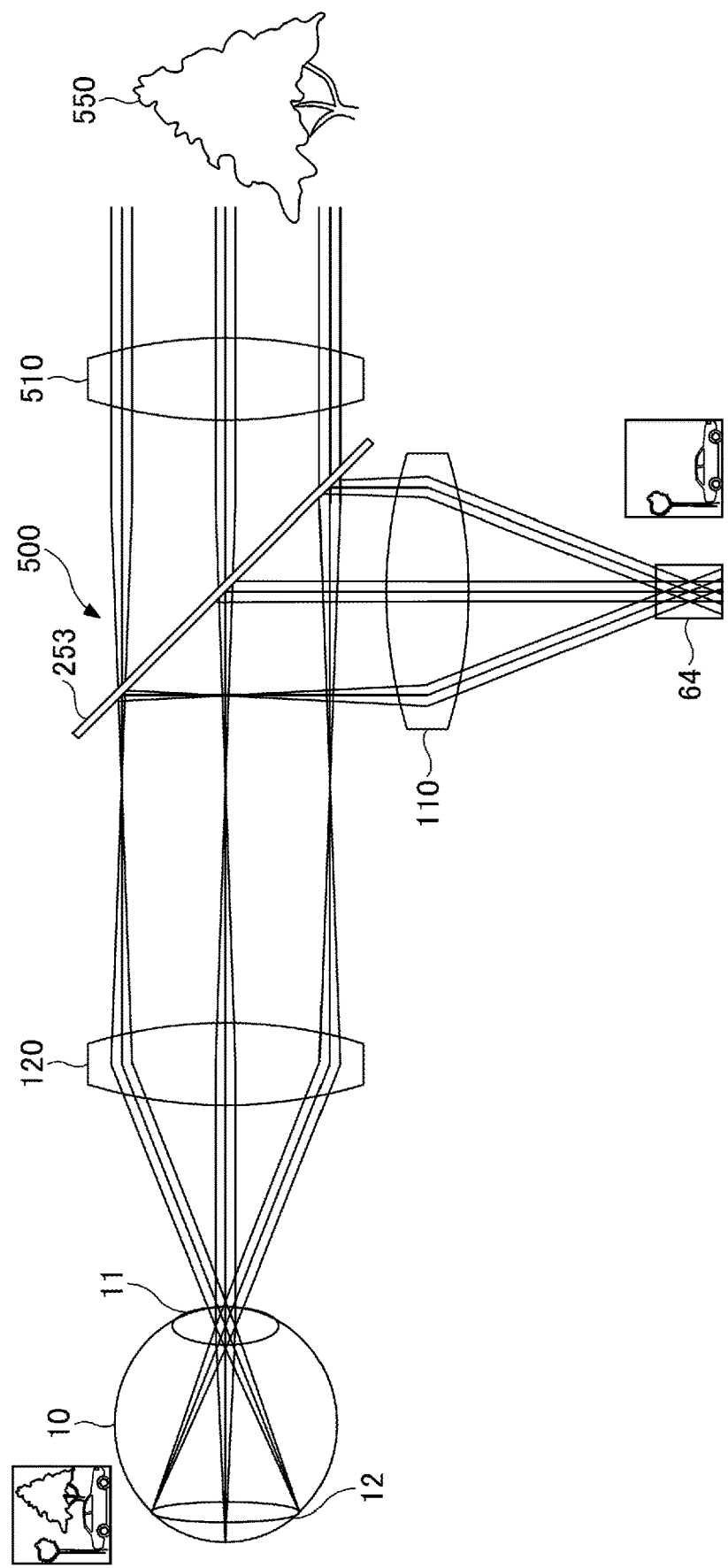
FIG. 30 is a diagram illustrating an image relay device 500A of a modification of Embodiment 5.

FIG. 30 is a diagram illustrating an image relay device 500A of a modification of Embodiment 5. The image relay device 500A has a configuration in which the mirror 253 of the image relay device 500 illustrated in FIG. 29 is replaced with a partially transmissive mirror 553 and a lens 510 is added. The distance between the lens 510 and the back surface of the partially transmissive mirror 553 is equal to the distance between the front surface of the partially transmissive mirror 553 and the position of the lens 110.

A tree 550 is arranged as a subject on the back surface side of the partially transmissive mirror 553. The image of the tree 550 passes through the partially transmissive mirror 553, enters the pupil 11 through the lens 120 to form an image on the retina 12.

Therefore, when a scan unit 64 scans the laser light to draw an image of an automobile or the like, an image in which the image of the tree 550 is superimposed on the image of the automobile or the like is formed on the retina 12. Although the tree 550 is illustrated here, instead of the tree 550, images of various objects can be superimposed on the image output from the laser emitting unit 60. That is, an Augmented Reality (AR) image can be formed on the user's retina 12.

Therefore, according to the modification of Embodiment 5, the image relay device 500 capable of forming an AR image on the retina 12 is provided.

The image relay device of an example embodiment of the present invention has been described in detail above. However, the present invention is not limited to the described embodiments, and various modifications and substitutions can be made without departing from the scope of claims.

This patent application claims its priority based on Japanese Patent Application No. 2019-063722 filed on Mar. 28, 2019, and Japanese Patent Application No. 2020-040194 filed on Mar. 9, 2020, and the entire contents of these Japanese patent applications are incorporated herein by reference.

REFERENCE SIGNS LIST 50 smartphone (projection device)
50A pico projector
52 display
60 laser emitting unit
61 light source
64 scan unit
100, 200 image relay device
110, 120, 210, 220, 510 lens
130 lens barrel
140 housing
150, 250, holder

The invention claimed is:
1. An image relay device comprising:
a first optical member that receives light beams of parallel light from a projection device, the projection device including a light source configured to emit laser light and a scan unit configured to scan the laser light based on image data, the projection device configured to scan the laser light based on the image data to be output as image light, the first optical member configured to convert each of the light beams of parallel light such that optical axes of the light beams become parallel to each other and each of the light beams becomes convergent light; and a second optical member that converts each of the light beams transmitted through the first optical member into parallel light beams, and converges the parallel light beams into a point in proximity of a pupil of a user;

an attenuation filter that attenuates each of the light beams; and a position adjusting unit configured to change a distance between the first optical member and the second optical member, wherein the position adjusting unit changes the distance between the first optical member and the second optical member according to a beam diameter of each of the light beams to improve focus accuracy of Maxwellian view.

2. The image relay device according to claim 1, wherein the second optical member comes into contact with the user's eye during use of the image relay device, and the first optical member and the second optical member form an optical system that is conjugated at a scanning origin of the scan unit and a pupil center of the user's eye.

3. The image relay device according to claim 1, further comprising a holding unit configured to hold the first optical member and the second optical member with respect to the projection device.

4. The image relay device according to claim 3, wherein the holding unit includes
a first holding unit configured to hold the first optical member with respect to the projection device, and
a second holding unit configured to hold the second optical member with respect to the projection device via the first holding unit and to be removable from the first holding unit.

5. The image projection system according to claim 4, wherein the second holding unit can be replaced with another second holding unit configured to hold another second optical member having a different viewing angle and field of view from the second optical member.

6. The image relay device according to claim 3, wherein the holding unit includes a rotating mechanism configured to rotate with respect to an optical axis of the parallel light incident from the projection device,
wherein an image visually recognized by the user via the second optical member can be switched between a wider-than-tall image and a taller-than-wide image by rotating the rotating mechanism.

7. The image relay device according to claim 1, further comprising a transparent member, wherein the transparent member is provided at a converging position where each of the light beams converges between the first optical member and the second optical member, the transparent member transmits each of the light beams, a predetermined image is drawn on the transparent member, and the transparent member is removable.

8. The image relay device according to claim 7, wherein the predetermined image represents an index for a visual acuity test.

9. The image relay device according to claim 1, wherein the attenuation filter includes N attenuation filters, where N is an integer equal to or greater than two, and N−1 attenuation filters have an attenuation rate suitable for Class 1 of IEC60825 as a laser product safety standard.

10. The image relay device according to claim 1, wherein the image light is composed of laser light of three colors red laser light, green laser light, and blue laser light, and the attenuation filter attenuates the blue laser light to 0.25 µW or more and 11.36 µW or less.

11. The image relay device according to claim 1, wherein the position adjusting unit changes the distance between the second optical member and the first optical member by adjusting a position of the second optical member.

12. The image relay device according to claim 1, wherein when a viewing angle of the second optical member is a second viewing angle that is wider than a first viewing angle, a light transmittance of the attenuation filter is set to a second light transmittance that is higher than a first light transmittance.

13. The image relay device according to claim 12, wherein when the first viewing angle of the second optical member is 40 degrees, the attenuation filter attenuates the image light to 0.639 µW, and when the second viewing angle of the second optical member is 60 degrees, the attenuation filter attenuates the image light to 1.34 µW.

14. An image projection system comprising:
a projection device that includes a light source configured to emit laser light and a scan unit configured to scan the laser light based on image data, and scans the laser light based on the image data to output as image light;
an image relay device that relays the laser light output from the projection device; and
a holding unit configured to hold the image relay device with respect to the projection device,
wherein the image relay device includes a first optical member converting each of light beams of parallel light incident from the projection device so that optical axes of each of the light beams are parallel and each of the light beams becomes a convergent light, a second optical member that converts each of the light beams transmitted through the first optical member into parallel light beams, and converges the parallel light beams into a point in proximity of a pupil of a user, an attenuation filter that attenuates each of the light beams, and a position adjusting unit configured to change a distance between the first optical member and the second optical member,
wherein the position adjusting unit changes the distance between the first optical member and the second optical member according to a beam diameter of each of the light beams to improve focus accuracy of Maxwellian view.

15. The image projection system according to claim 14, wherein the image light is composed of laser light of three colors red laser light, green laser light, and blue laser light, the attenuation filter includes N attenuation filters, where N is an integer equal to or greater than two, N−1 attenuation filters have an attenuation rate suitable for Class 1 of IEC60825 as a laser product safety standard, and the attenuation filter attenuates the blue laser light to 0.25 µW or more and 11.36 µW or less.

16. The image projection system according to claim 14, wherein the second optical member in the image relay device comes into contact with the user's eye during use of the image relay device, and the second optical member converges each of the light beams converted into the parallel light in proximity of a pupil of the user's eye to project the image light output from the projection device onto a retina of the user's eye.

* * * * *